US012615529B2

(12) United States Patent
Stark et al.

(10) Patent No.: US 12,615,529 B2
(45) Date of Patent: Apr. 28, 2026

(54) METHODS AND APPARATUSES FOR RADIO COMMUNICATION

(71) Applicant: Robert Bosch GmbH, Stuttgart (DE)

(72) Inventors: Maximilian Stark, Hamburg (DE); Khaled Shawky Hassan, Sarstedt (DE); Frank Hofmann, Hildesheim (DE); Oscar Dario Ramos Cantor, Hildesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 392 days.

(21) Appl. No.: 18/318,312

(22) Filed: May 16, 2023

(65) Prior Publication Data

US 2024/0388933 A1     Nov. 21, 2024

(51) Int. Cl.
*H04W 24/08*          (2009.01)
*H04B 17/318*         (2015.01)

(52) U.S. Cl.
CPC .......... *H04W 24/08* (2013.01); *H04B 17/328* (2023.05)

(58) Field of Classification Search
CPC .... H04W 24/08; H04W 72/23; H04B 17/309; H04B 17/328
See application file for complete search history.

(56) References Cited

U.S. PATENT DOCUMENTS

| | | | | |
|---|---|---|---|---|
| 11,476,911 | B2 * | 10/2022 | Bai | H04L 1/0026 |
| 12,101,155 | B2 * | 9/2024 | Pezeshki | H04B 7/0639 |
| 12,177,148 | B2 * | 12/2024 | Tsai | H04B 7/0636 |
| 12,191,938 | B2 * | 1/2025 | Marzban | H04L 1/0015 |
| 12,483,930 | B2 * | 11/2025 | Tan | H04W 28/06 |
| 2020/0259575 | A1 | 8/2020 | Bai et al. | |
| 2021/0326726 | A1 * | 10/2021 | Wang | G06N 20/00 |
| 2021/0376895 | A1 | 12/2021 | Xue et al. | |
| 2022/0123807 | A1 * | 4/2022 | Rose | H04B 17/373 |
| 2022/0229163 | A1 * | 7/2022 | Viswanatha | G01S 7/493 |
| 2022/0368379 | A1 * | 11/2022 | Tsai | H04B 7/0478 |
| 2022/0386292 | A1 * | 12/2022 | Hajri | H04L 5/0057 |
| 2023/0013751 | A1 * | 1/2023 | Zhou | H04B 7/063 |

FOREIGN PATENT DOCUMENTS

WO     WO-2024076755 A1 *    4/2024    ......... H04L 25/0204

* cited by examiner

*Primary Examiner* — Mong-Thuy T Tran
(74) *Attorney, Agent, or Firm* — NORTON ROSE FULBRIGHT US LLP

(57)          ABSTRACT

A method for radio communication, especially according to an estimation support mode. The method includes monitoring at least one downlink channel; determining at least one downlink channel quality associated with the monitored at least one downlink channel; determining, based at least on the at least one monitored downlink channel quality, at least one future downlink channel quality indicator that characterizes an estimated future quality associated with the downlink channel; determining, based at least on the at least one monitored downlink channel quality, at least one estimation quality indicator that characterizes an estimation quality of the at least one associated future downlink channel indicator; transmitting the at least one estimation quality indicator; and transmitting the at least one future downlink channel quality indicator.

16 Claims, 12 Drawing Sheets

METHODS AND APPARATUSES FOR RADIO COMMUNICATION

FIELD

The present invention concerns methods and apparatuses for radio communication.

BACKGROUND INFORMATION

Modern communication systems adapt the used modulation and coding scheme to the channel conditions in order to optimize the spectral efficiency of the system.

As the 3GPP framework uses a multi-carrier waveform, i.e., OFDM, the used modulation and coding scheme can also be optimized for the resource blocks. Thus, accurate CSI leverages the channel efficiently. In NR, the downlink measurements are reported by the UE to the BS regularly. The measurement report typically includes the channel quality indicator (CQI), precoding matrix indicator (PMI) and the rank indicator (RI).

Moreover, Non-terrestrial Networks, NTN, using satellite-style gNBs are envisioned.

SUMMARY

An aspect of the present invention is directed to the following subject-matter: A method comprising, especially according to an estimation support mode: monitoring at least one downlink channel; determining at least one downlink channel quality associated with the monitored at least one downlink channel; determining, based at least on the at least one monitored downlink channel quality, at least one future downlink channel quality indicator that characterizes an estimated future quality associated with the downlink channel; determining, based at least on the at least one monitored downlink channel quality, at least one estimation quality indicator that characterizes an estimation quality of the at least one associated future downlink channel indicator; transmitting the at least one estimation quality indicator; and transmitting the at least one future downlink channel quality indicator.

Advantageously, for example a radio terminal is enabled to support the radio access node with an expected future quality associated with the downlink channel that the radio terminal expects at a future point in time to experience. On the one hand, privacy and security benefit as only the abstract quality associated with the downlink channel is transmitted. On the other hand, spectrum efficiency is increased as the radio access node is enabled to adapt its downlink transmission parameters so that the radio terminal is enabled to promptly receive downlink data with a decreased repetition probability.

The estimation quality indicator advantageously provides a prediction accuracy indication for the radio access network. Therefore, the radio access network is able to determine an appropriate transmission parameter, like MCS, transmission power, sub channel, etc. UE is able to help the BS to adapt, for example, the modulation and coding scheme based on this reported information to not violate the channel capacity, an erroneous predicted report might even decrease the system performance.

A beneficial example embodiment of the present invention includes that the method further comprises: receiving a support configuration indicating at least one support mode, especially the estimation support mode.

Advantageously, the support configuration enables both the radio terminal and the radio access node to react flexibly on the environmental conditions that affect the radio domain.

A beneficial example embodiment of the present invention includes that the method further comprises: determining at least one future propagation delay associated with the at least one downlink channel; determining, based on the determined at least one future propagation delay, at least one estimation horizon that characterizes a time period for which the at least one future downlink channel quality indicator and its associated estimation quality indicator, or the at least one support configuration is valid.

For example, benefits can be achieved by that the support configuration indicates an assisting support mode, wherein, according to the assisting support mode, the method comprises: monitoring the at least one downlink channel; determining the at least one downlink channel quality associated with the monitored at least one downlink channel; and transmitting the at least one downlink channel quality.

Advantageously, transmitting the downlink channel quality provides a legacy mode for UEs that are not able to determine a prediction for the downlink quality.

Another example embodiment of the present invention is characterized by that the at least one estimation quality indicator is, at least at the time of its transmission, valid for an undetermined period of time, in particular for a time period an RRC state is active.

Advantageously, the validity of the estimation quality is transmitted once at the beginning and is valid absent a contrary signal from the radio terminal.

Another example embodiment of the present invention is characterized by that the method further comprises: determining, based at least on the at least one monitored downlink channel quality, at least one further future downlink channel quality indicator that characterizes an estimated future quality associated with the downlink channel; determining, based at least on the at least one monitored downlink channel quality, at least one further estimation quality indicator that characterizes an estimation quality of the at least one associated future downlink channel indicator; comparing the at least one further estimation quality indicator and the at least one previously determined estimation quality indicator; and transmitting the at least one further estimation quality indicator based on the comparison.

Advantageously, the further estimation quality indicator enables signaling of a change in the estimation quality. Advantageously, the further estimation quality indicator replaces the previously determined estimation quality indicator. For example, based on a sudden change of the further estimation quality indicator, the further estimation quality indicator is transmitted.

Benefits are achieved by that the method further comprises: determining, via a machine-trained downlink-embedding function, a first latent code based on the at least one downlink channel quality; determining, via a machine-trained assisting-data embedding function, a second latent code based on ego-sensor based data; determining, via a machine-trained prediction function, the at least one future downlink channel indicator and the least one estimation quality indicator based at least on the first latent code and based on the second latent code.

When targeting the problem of downlink CSI, the UE has naturally more information than the gNB as the measurements are conducted in the UE. Furthermore, the UE has access to additional ego-sensor information as cameras, route information etc. that might have stricter, e.g., privacy, constraints and cannot be shared with the BS. Thus, the UE will be more eligible for providing a prediction on the channel quality. However, the predictions of the UE will be used to assist the BS in its selection of the modulation scheme. Therefore, an accuracy measure attached to the prediction is required to not trigger disadvantageous decision of the gNB, in turn, resulting in a performance worse than without predictive COI. In other words, the provided machine-learning architecture is capable of: fusing ego-sensor information to improve the downlink quality, for example CQI in a radio communications network.

As the NTN can be seen as an extension to classical TN, terrestrial network, in certain areas (underground, tunnel, bridge, etc.) the NTN coverage might be suddenly degraded. These sporadic events depend on the geographic location of the UE and its relative position to the satellite. Therefore, probabilistic channel models as used in literature will be insufficient for designing appropriate predictors. Thus, data driven approaches do not require a closed form channel model but instead can be trained to realistic propagation scenarios.

Another example embodiment of the present invention is characterized by that the support configuration comprises at least one estimation horizon that characterizes a time period for which the at least one future downlink channel quality indicator and its associated estimation quality indicator, or the at least one support configuration is valid, and wherein the at least one future downlink channel quality indicator and its associated estimation quality indicator are determined based on the at least one estimation horizon.

Benefits are achieved by that the method further comprises: receiving an estimation capability request; determining, upon reception of the estimation capability request, an estimation capability response especially indicating at least at least one support mode, especially the estimation support mode; transmitting the estimation capability response; and wherein the support configuration is received as a reply to the transmitted estimation capability response.

Benefits are achieved by that, according to the assisting support mode, the method further comprises: determining assisting information characterizing at least one present or future condition of the downlink channel receiving apparatus or of a physical entity the receiving apparatus is associated or mounted to; and transmitting the assisting information.

Advantageously, the assisting information provides an alternative to the transmission of the future downlink quality indicator and its associated estimation quality indicator. Especially if the radio terminal is not enabled or not configured to determine the former indicators, the radio access node is enabled to determine internally the future downlink channel quality indicator.

For example, benefits can be achieved by that the at least one further estimation quality indicator indicates a difference with respect to the previously transmitted at least one estimation quality indicator.

Advantageously, by transmitting the difference, few bits are sufficient to adapt the estimation quality at the side of the gNB/radio access node and radio efficiency for submitting control information is increased.

Going further, an example embodiment of the present invention is advantageous in that the at least one estimation quality indicator and the associated future downlink channel quality indicator are transmitted pairwise.

Advantageously, the radio access node has always an indication of the estimation quality. Therefore, sudden changes in estimation quality are received together with the estimated downlink channel quality and immediate adaption of the downlink channel is enabled.

A beneficial example embodiment of the present invention is characterized by that the method further comprises: observing the at least one parameter associated with a sidelink channel; determining, via a machine-trained sidelink-embedding function, a third latent code based on the at least one parameter associated with the sidelink channel; and wherein the at least one future downlink channel indicator and the at least one estimation quality indicator are further determined based on the at least one third latent code.

Exploiting sidelink information has the benefit as the sidelink serves as a 'further perspective' on the local environment of the radio terminal.

An aspect of the present invention is directed to the following subject-matter: An apparatus, especially a radio terminal or user equipment or a module thereof, comprising, especially according to an estimation support mode: monitoring means (i.e., a monitoring arrangement) configured to monitor at least one downlink channel; determining means (i.e., a determining arrangement) configured to determine at least one downlink channel quality associated with the monitored at least one downlink channel; determining means (i.e., a determining arrangement) configured to determine, based at least on the at least one monitored downlink channel quality, at least one future downlink channel quality indicator that characterizes an estimated future quality associated with the downlink channel; determining means (i.e., a determining arrangement) configured to determine, based at least on the at least one monitored downlink channel quality, at least one estimation quality indicator that characterizes an estimation quality of the at least one associated future downlink channel indicator; transmitting means (i.e., a transmitter) configured to transmit the at least one estimation quality indicator; and transmitting means (i.e., a transmitter) configured to transmit the at least one future downlink channel quality indicator.

An aspect of the present invention is directed to the following subject-matter: A method comprising, especially according to an estimation support mode: receiving at least one future downlink channel quality indicator that characterizes an estimated future quality associated with a downlink channel; receiving at least one estimation quality indicator that characterizes an estimation quality of the at least one associated future downlink channel indicator; determining at least one transmission parameter based at least on the received at least one future downlink channel quality indicator and based on the at least one estimation quality indicator; and transmitting, via the downlink channel, downlink data in accordance with the determined at least one transmission parameter.

Going further, an example is advantageous by comprising: transmitting a support configuration indicating at least one support mode, especially the estimation support mode.

Advantageously, the support configuration enables both the radio terminal and the radio access node to react flexibly on the environmental conditions that affect the radio domain.

Going further, an example embodiment of the present invention is advantageous in that the support configuration indicates an assisting support mode, wherein, according to the assisting support mode, the method comprises: receiving at least one downlink channel quality; receiving assisting information characterizing at least one present or future condition of the downlink channel receiving apparatus; determining, based on the at least one downlink channel quality and based on the at least one assisting information, a further transmission parameter; and transmitting, via the downlink channel, downlink data in accordance with the further transmission parameter.

Advantageously, the assisting information provides an alternative to the transmission of the future downlink quality indicator and its associated estimation quality indicator. Especially if the radio terminal is not enabled or not configured to determine the former indicators, the radio access node is enabled to determine internally the future downlink channel quality indicator and, in turn, the further transmission parameter.

Going further, an example embodiment of the present invention is advantageous in that the at least one estimation quality indicator is, at least at the time of its reception, valid for an undetermined period of time, in particular for a time period an RRC state exists.

Advantageously, the validity of the estimation quality is transmitted once at the beginning and is valid absent a contrary signal from the radio terminal.

Benefits are achieved by that the method further comprises: determining, based at least on the at least one monitored downlink channel quality, at least one further future downlink channel quality indicator that characterizes an estimated future quality associated with the downlink channel; determining, based at least on the at least one monitored downlink channel quality, at least one further estimation quality indicator that characterizes an estimation quality of the at least one associated future downlink channel indicator; comparing the at least one further estimation quality indicator and the at least one previously determined estimation quality indicator; and transmitting the at least one further estimation quality indicator based on the comparison.

A beneficial example embodiment of the present invention is characterized by receiving at least one further estimation quality indicator that indicates a difference with respect to the previously received at least one estimation quality indicator; and determining a further transmission parameter based at least on the previously received at least one estimation quality indicator and based on the received at least one further estimation quality indicator; and transmitting, via the downlink channel, another downlink data in accordance with the determined further transmission parameter.

Advantageously, by transmitting the difference, few bits are sufficient to adapt the estimation quality at the side of the gNB/radio access node and radio efficiency for submitting control information is increased.

Advantageously, the further estimation quality indicator enables signaling of a change in the estimation quality. Advantageously, the further estimation quality indicator replaces the previously determined estimation quality indicator. For example, based on a sudden change of the further estimation quality indicator, the further estimation quality indicator is transmitted.

Benefits are achieved by that the support configuration comprises at least one estimation horizon that characterizes a time period for which the at least one future downlink channel quality indicator and its associated estimation quality indicator, or the at least one support configuration is valid, and wherein the at least one future downlink channel quality indicator and its associated estimation quality indicator are determined based on the at least one estimation horizon.

A beneficial example embodiment of the present invention is characterized by that the method further comprises: determining an estimation capability request based on present requirements for supporting downlink channel parameter adaption; transmitting an estimation capability request; receiving, upon transmission of the estimation capability request, an estimation capability response especially indicating at least at least one support mode, especially the estimation support mode; wherein the support configuration is determined and transmitted as a reply to the transmitted estimation capability response.

An aspect of the present invention is directed to the following subject-matter: An apparatus, especially a radio access node of a radio access network or a module thereof, comprising, especially according to an estimation support mode: receiving means (i.e., a receiver) configured to receive at least one future downlink channel quality indicator that characterizes an estimated future quality associated with a downlink channel;

receiving means (i.e., a receiver) configured to receive at least one estimation quality indicator that characterizes an estimation quality of the at least one associated future downlink channel indicator; determining means (i.e., a determining arrangement) configured to determine at least one transmission parameter based at least on the received at least one future downlink channel quality indicator and based on the at least one estimation quality indicator; and transmitting means (i.e., a transmitter) configured to transmit, via the downlink channel, downlink data in accordance with the determined at least one transmission parameter.

An aspect of the present invention is directed to the following subject-matter: A method comprising: transmitting first information that characterizes at least one quality associated with a downlink channel received by a radio terminal;

transmitting second information that characterizes a present or future environmental situation of a physical entity that is associated with the radio terminal.

Advantageously, the processing effort is shifted towards the gNB in order to perform the prediction. The provided machine learning architecture is able to perform prediction for example if COI at the side of the radio access network.

Benefits are achieved by that the transmitted first information is a first latent code, wherein the method further comprises: determining at least one measured downlink channel quality from observing a downlink channel; and determining, via a machine-trained downlink-embedding function, the first latent code based on the at least one measured downlink channel quality.

Advantageously, the first latent code may comprise information more relevant as input for a further trained function with less data usage. Therefore, not only prediction quality on the side of the gNB is increased but also the spectrum efficiency is increased.

Benefits are achieved by that the transmitted second information is a second latent code, wherein the method further comprises: determining ego-sensor-based data based on at least one sensor measurement associated with the physical entity; and determining, via a machine-trained assisting-information-embedding function, the second latent code.

Advantageously, the second latent code may comprise information more relevant as input for a further trained function with less data usage. Therefore, not only prediction quality on the side of the gNB is increased but also the spectrum efficiency is increased.

Another example is characterized by that the method further comprises: transmitting third information that characterizes at least one parameter associated with a sidelink channel.

Going further, an example embodiment of the present invention is advantageous in that the transmitted first information is at least one measured downlink channel quality, wherein the method further comprises: determining the at least one measured downlink channel quality from observing a downlink channel.

Advantageously, the first information could be a QCI, 5QI or another parameter.

Another example is characterized by that the transmitted second information is ego-sensor-based data, wherein the method further comprises: determining the ego-sensor-based data based on at least one sensor measurement of a sensor associated with the physical entity.

Advantageously, processing effort is shifted towards the gNB. Therefore, energy efficiency is increased at the side of the probably mobile radio terminal.

A beneficial example embodiment of the present invention is characterized in that the transmitted third information is a third latent code, wherein the method further comprises: observing the at least one parameter associated with the sidelink channel; and determining, via a machine-trained sidelink-embedding function, the third latent code based on the at least one parameter associated with the sidelink channel.

Advantageously, the third latent code may comprise information more relevant as input for a further trained function at gNB with less data usage. Therefore, not only prediction quality on the side of the gNB is increased but also the spectrum efficiency is increased.

Benefits are achieved by that the method further comprises: observing the at least one parameter associated with the sidelink channel, wherein the transmitted third information is the at least one sidelink parameter associated with the sidelink channel.

Advantageously, processing effort is shifted towards the gNB. Therefore, energy efficiency is increased at the side of the probably mobile radio terminal.

An aspect of the present invention is directed to the following subject-matter: An apparatus, especially a radio terminal or user equipment or a module thereof, comprising: transmitting means to transmit first information that characterizes at least one quality associated with a downlink channel received by a radio terminal; transmitting means to transmit second information that characterizes a present or future environmental situation of a physical entity that is associated with the radio terminal.

An aspect of the present invention is directed to the following subject-matter: A method comprising: receiving first information that characterizes at least one quality associated with a downlink channel received by an apparatus; receiving second information that characterizes a present or future environmental situation of a physical entity which is associated with the apparatus; determining, via at least one machine-trained function, at least one downlink transmission parameter based on the at least one first information and based on the at least one second information; and transmitting downlink data via the downlink channel in accordance with the at least one determined downlink transmission parameter.

Advantageously, the downlink channel transmission are adapted according to the environmental situation at the UE side.

A beneficial example embodiment of the present invention is characterized in that the received first information is a first latent code, and wherein the second information is a second latent code, wherein the method further comprises: determining, via a machine-trained predictor function, the at least one downlink transmission parameter based on the received first latent code and based on the received second latent code.

Advantageously, the second latent code may comprise information more relevant as input for a further trained function with less data usage. Therefore, not only prediction quality on the side of the gNB is increased but also the spectrum efficiency is increased.

Benefits are achieved by that the received first information is at least one downlink channel quality, and wherein the second information is a second latent code, wherein the method further comprises: determining, via a machine-trained downlink-embedding function, at least one first latent code based on the received downlink quality; determining, via a machine-trained predictor function, the at least one downlink transmission parameter based on the determined first latent code and based on the received second latent code.

Advantageously, the first information could be a QCI, 5QI or another parameter.

Another example embodiment of the present invention is characterized in that the received first information is at least one first latent code, and wherein the second information is ego-sensor based data, wherein the method further comprises: determining, via a machine-trained assisting-data-embedding function, at least one second latent code based on the received ego-sensor based data; determining, via a machine-trained predictor function, the at least one downlink transmission parameter based on the determined first latent code and based on the received second latent code.

Advantageously, processing effort is shifted towards the gNB. Therefore, energy efficiency is increased at the side of the probably mobile radio terminal.

A beneficial example embodiment of the present invention is characterized by that the method further comprises: receiving third information that characterizes at least one parameter associated with a sidelink channel.

For example, benefits can be achieved by that the method further comprises: determining, via the at least one machine-trained function, at least one future downlink channel quality indicator that characterizes an estimated future quality associated with the downlink channel and at least one estimation quality indicator that characterizes an estimation quality of the at least one associated future downlink channel indicator based at least on the first information and based on at least the second information; and determining the at least one transmission parameter based at least on the at least one future downlink channel quality indicator and based on the at least one estimation quality indicator.

Another example embodiment of the present invention is characterized by that the received third information is a third latent code, wherein the method further comprises: determining, via the at least one machine-trained function, the at least one downlink transmission parameter based at least one the third latent code.

Advantageously, the third latent code may comprise information more relevant as input for a further trained function at gNB with less data usage. Therefore, not only prediction quality on the side of the gNB is increased but also the spectrum efficiency is increased.

Benefits are achieved by that the received third information is the at least one sidelink parameter associated with the sidelink channel, wherein the method further comprises: determining, via a sidelink-embedding machine-trained function, at least one third latent code, and determining, via the at least one machine-trained function, the at least one downlink transmission parameter based at least on the third latent code.

Advantageously, processing effort is shifted towards the gNB. Therefore, energy efficiency is increased at the side of the radio terminal.

Example embodiments of the present invention are also described in the numbered examples below.

Example 1. A method comprising, especially according to an estimation support mode (ESM):

monitoring (106) at least one downlink channel (DLCH);

determining (108) at least one downlink channel quality (Q #1, Q #2) associated with the monitored at least one downlink channel (DLCH);

determining (110), based at least on the at least one monitored downlink channel quality (Q #1, Q #2), at least one future downlink channel quality indicator (fQ #1, fQ #2) that characterizes an estimated future quality associated with the downlink channel (DLCH);

determining (112), based at least on the at least one monitored downlink channel quality (Q #1, Q #2), at least one estimation quality indicator (e #1, e #2) that characterizes an estimation quality of the at least one associated future downlink channel indicator (fQ #1, fQ #2);

transmitting (114; 164) the at least one estimation quality indicator (e #1, e #2); and transmitting (116; 166) the at least one future downlink channel quality indicator (fQ #1, fQ #2).

Example 2. The method according to example 1, comprising:

receiving (102) a support configuration (sc) indicating at least one support mode, especially the estimation support mode (ESM).

Example 3. The method according to example 1 or 2, wherein the method further comprises:

receiving (140) an estimation capability request (ecRq);

determining (142), upon reception of the estimation capability request (ecRq), an estimation capability response (eqResp) especially indicating at least at least one support mode, especially the estimation support mode (ESM);

transmitting (144) the estimation capability response (ecResp); and wherein the support configuration (sc) is received as a reply to the transmitted estimation capability response (ecResp).

Example 4. The method according to one of the examples 1 to 3, wherein the support configuration (sc) indicates an assisting support mode (ASM), wherein, according to the assisting support mode (ASM), the method comprises:

monitoring (106) the at least one downlink channel (DLCH);

determining (110) the at least one downlink channel quality (Q #3) associated with the monitored at least one downlink channel (DLCH); and transmitting (132) the at least one downlink channel quality (Q #3).

Example 5. The method according to example 4, wherein, according to the assisting support mode (ASM), the method further comprises:

determining (130) assisting information (AS) characterizing at least one present or future condition of the downlink channel receiving apparatus (RT) or of a physical entity the receiving apparatus (RT) is associated or mounted to; and transmitting (134) the assisting information (AS).

Example 6. The method according to one of the examples 1 to 5, wherein the at least one estimation quality indicator (e #1, e #2) is, at least at the time of its transmission, valid for an undetermined period of time, in particular for a time period an RRC state is active.

Example 7. The method according to one of the examples 1 to 6, wherein the method further comprises:

determining, via a machine-trained downlink-embedding function (410), a first latent code (LC #A) based on the at least one downlink channel quality (Q #1);

determining, via a machine-trained assisting-data embedding function (420), a second latent code (LC #B) based on ego-sensor based data (esD #1);

determining, via a machine-trained prediction function (490), the at least one future downlink channel indicator (fQ #1, fQ #2) and the least one estimation quality indicator (e #1, e #2) based at least on the first latent code (LC #A) and based on the second latent code (LC #B).

Example 8. An apparatus, especially a radio terminal or user equipment (UE #1) or a module thereof, comprising, especially according to an estimation support mode (ESM):

monitoring means configured to monitor (106) at least one downlink channel (DLCH);

determining means configured to determine (108) at least one downlink channel quality (Q #1, Q #2) associated with the monitored at least one downlink channel (DLCH);

determining means configured to determine (110), based at least on the at least one monitored downlink channel quality (Q #1, Q #2), at least one future downlink channel quality indicator (fQ #1, fQ #2) that characterizes an estimated future quality associated with the downlink channel (DLCH);

determining means configured to determine (112), based at least on the at least one monitored downlink channel quality (Q #1, Q #2), at least one estimation quality indicator (e #1, e #2) that characterizes an estimation quality of the at least one associated future downlink channel indicator (fQ #1, fQ #2);

transmitting means configured to transmit (114; 164) the at least one estimation quality indicator (e #1, e #2); and transmitting means configured to transmit (116; 166) the at least one future downlink channel quality indicator (fQ #1, fQ #2).

Example 9. A method comprising, especially according to an estimation support mode (ESM):

receiving (216) at least one future downlink channel quality indicator (fQ #1, fQ #2) that characterizes an estimated future quality associated with a downlink channel (DLCH);

receiving (214) at least one estimation quality indicator (e #1, e #2) that characterizes an estimation quality of the at least one associated future downlink channel indicator (fQ #1, fQ #2);

determining (218) at least one transmission parameter (p #2) based at least on the received at least one future downlink channel quality indicator (fQ #1, fQ #2) and based on the at least one estimation quality indicator (e #1, e #2); and transmitting (220), via the downlink channel (DLCH), downlink data (d #2) in accordance with the determined at least one transmission parameter (p #2).

Example 10. The method according to example 9, comprising:

transmitting (202) a support configuration (sc) indicating at least one support mode, especially the estimation support mode (ESM).

Example 11. The method according to example 9 or 10, wherein the method further comprises:

determining (238) an estimation capability request (ecRq) based on present requirements for supporting downlink channel parameter adaption;

transmitting (240) an estimation capability request (ecRq);

receiving (242), upon transmission of the estimation capability request (ecRq), an estimation capability response (eqResp) especially indicating at least at least one support mode, especially the estimation support mode (ESM);

wherein the support configuration (sc) is determined and transmitted as a reply to the transmitted estimation capability response (ecResp).

Example 12. The method according to one of the examples 9 to 11, wherein the support configuration (sc) indicates an assisting support mode (ASM), wherein, according to the assisting support mode (ASM), the method comprises:

receiving (232) at least one downlink channel quality (Q #3);

receiving (234) assisting information (AS) characterizing at least one present or future condition of the downlink channel receiving apparatus (RT);

determining (236), based on the at least one downlink channel quality (Q #3) and based on the at least one assisting information (AS), a further transmission parameter (p #3); and transmitting (237), via the downlink channel (DLCH), downlink data (d #3) in accordance with the further transmission parameter (p #3).

Example 13. The method according to one of the examples 9 to 12, comprising:

receiving (264) at least one further estimation quality indicator (e #2) that indicates a difference with respect to the previously received at least one estimation quality indicator (e #1); and determining (265) a further transmission parameter based at least on the previously received at least one estimation quality indicator (e #1) and based on the received at least one further estimation quality indicator (e #2); and transmitting, via the downlink channel, another downlink data in accordance with the determined further transmission parameter.

Example 14. An apparatus, especially a radio access node (gNB #1) of a radio access network or a module thereof, comprising, especially according to an estimation support mode (ESM):

receiving means configured to receive (216) at least one future downlink channel quality indicator (fQ #1, fQ #2) that characterizes an estimated future quality associated with a downlink channel (DLCH);

receiving means configured to receive (214) at least one estimation quality indicator (e #1, e #2) that characterizes an estimation quality of the at least one associated future downlink channel indicator (fQ #1, fQ #2);

determining means configured to determine (218) at least one transmission parameter (p #2) based at least on the received at least one future downlink channel quality indicator (fQ #1, fQ #2) and based on the at least one estimation quality indicator (e #1, e #2); and transmitting means configured to transmit (220), via the downlink channel (DLCH), downlink data (d #2) in accordance with the determined at least one transmission parameter (p #2).

Example 15. A use of one of the methods or apparatuses (RT, gNB #1) according to one of the preceding examples.

DETAILED DESCRIPTION OF EXAMPLE EMBODIMENTS

In the following, reference is made to the figures.

Figure 1:
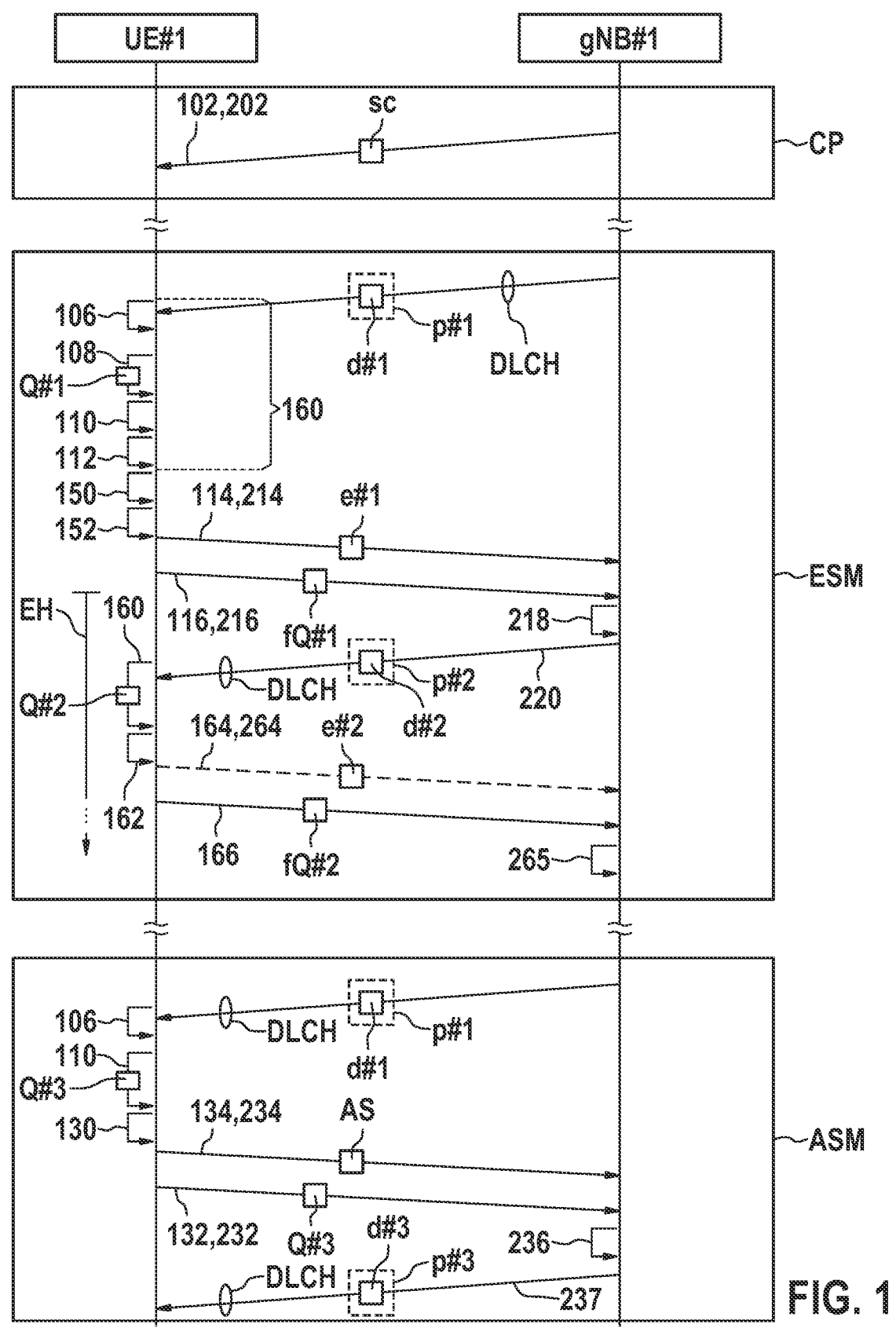
FIG. 1 depicts a schematical sequence diagram, according to an example embodiment of the present invention.

FIG. 1 depicts a schematical sequence diagram. An apparatus gNB #1, especially a radio access node or gNB, transmits 202 a support configuration sc towards an apparatus UE #1, in particular a radio terminal or user equipment, UE. UE #1 receives 102 the support configuration sc indicating a support mode, especially the estimation support mode ESM.

An example concerns a method comprising, especially according to the estimation support mode ESM: monitoring 106 downlink channel DLCH; determining 108 a downlink channel quality Q #1, Q #2 associated with the monitored downlink channel DLCH; determining 110, based at least on the monitored downlink channel quality Q #1, Q #2, future downlink channel quality indicator fQ #1, fQ #2 that characterizes an estimated future quality associated with the downlink channel DLCH; determining 112, based at least on the monitored downlink channel quality Q #1, Q #2, estimation quality indicator e #1, e #2 that characterizes an estimation quality of the associated future downlink channel indicator fQ #1, fQ #2; transmitting 114; 164 the estimation quality indicator e #1, e #2; and transmitting 116; 166 the future downlink channel quality indicator fQ #1, fQ #2.

The estimation support mode ESM is intended for supporting the radio access node in determining the transmission parameter for the transmission on a downlink channel DLCH. In the estimation support mode ESM, the determination and transmission of the estimation quality indicator e #1 . . . n is conducted at least once upon the reception of the support configuration sc.

There is depicted that the method further comprises: determining 150 a future propagation delay associated with the downlink channel; determining 152, based on the determined future propagation delay, an estimation horizon EH that characterizes a time period for which the future downlink channel quality indicator fQ #1 and its associated estimation quality indicator e #1, or the support configuration sc is valid.

Assuming sufficient knowledge of the relative distances at the UE side. The UE can compute the future propagation delay and the estimation horizon EH itself. In this case, the respective field in support configuration sc stays empty or is ignored.

According to an example, The future propagation delay is determined based on at least one of: the current location of UE #1, heading of UE #1, speed of UE #1, position of gNB #1 in the future.

There is illustrated that the support configuration sc indicates an assisting support mode ASM, wherein, according to the assisting support mode ASM, the method comprises: monitoring 106 the downlink channel DLCH; determining 110 the downlink channel quality Q #3 associated with the monitored downlink channel DLCH; and transmitting 132 the downlink channel quality Q #3.

Shown is that, according to the assisting support mode ASM, the method further comprises: determining 130 assisting information AS characterizing a present or future condition of the downlink channel receiving apparatus RT or of a physical entity the receiving apparatus RT is associated or mounted to; and transmitting 134 the assisting information AS.

According to an example, the estimation quality indicator e #1, e #2 is, at least at the time of its transmission, valid for an RRC state is active. In this case, the estimation quality indicator is valid e #1, e #2 during a time period associated with a session according to which the radio terminal is connected to the radio access node. Upon receiving a new fQ #2, gNB #1 replaces or updates its valid value for the prediction in the sense of fQ #2.

There is illustrated that the method further comprises: determining 160, based at least on the monitored downlink channel quality Q #2, the further future downlink channel quality indicator fQ #2 that characterizes an estimated future quality associated with the downlink channel DLCH; determining 160, based at least on the monitored downlink channel quality Q #2, a further estimation quality indicator e #2 that characterizes an estimation quality of the associated future downlink channel indicator fQ #1, fQ #2; comparing 162 the further estimation quality indicator e #2 and the previously determined estimation quality indicator e #1; and transmitting 164 the further estimation quality indicator e #2 based on the comparison.

According to an example, the further estimation quality indicator e #2 indicates a difference with respect to the previously transmitted estimation quality indicator e #1. In other words, an update of the estimation quality is done at the side of gNB #1 in order to appropriately determine the next downlink transmission parameter. For example, e #1 is transmitted as a starting value at the beginning of the connection establishment or during a connection. gNB #1 provides a first lookup table to determine MSE and/or CE in terms of the downlink transmission parameter p #2 based on the received e #1.

According to a further example, e #2 represents a pointer to a second lookup table. gNB #1 provides the second lookup table to determine the positive or negative difference with respect to the associated e #1.

For example, the estimation indicator e #2 is transmitted, if the comparison indicates a difference or change in the estimation quality indicator e #2 is significant. For example, a threshold operation decides whether the transmission of e #2 is conducted or not. In another example, a pre-defined or trainable function takes both e #1 and e #2 as an input and outputs the transmission decision.

The steps 106-112 are referred to with the reference sign 160. After the determining 160 at least the one further future downlink channel quality indicator fQ #2 is transmitted 166 towards the apparatus gNB #1. As indicated by the dotted line, a transmission 164 of the further estimation quality indicator e #2 is optional and can be omitted.

In other words, the estimated future quality associated with the downlink channel is a quality that the UE expects to experience at a future point in time or during a future time span. For example, the future downlink channel quality indicator represents a determination accuracy of the associated future downlink channel quality indicator.

Shown is an apparatus UE #1, especially a radio terminal or user equipment or a module thereof, comprising, especially according to an estimation support mode ESM: monitoring means configured to monitor 106 the downlink channel DLCH; determining means configured to determine 108 the downlink channel quality Q #1, Q #2 associated with the monitored downlink channel DLCH; determining means configured to determine 110, based at least on the monitored downlink channel quality Q #1, Q #2, the future downlink channel quality indicator fQ #1, fQ #2 that characterizes an estimated future quality associated with the downlink channel DLCH; determining means configured to determine 112, based at least on the monitored downlink channel quality Q #1, Q #2, the estimation quality indicator e #1, e #2 that characterizes an estimation quality of the associated future downlink channel indicator fQ #1, fQ #2; transmitting means configured to transmit 114; 164 the estimation quality indicator e #1, e #2; and transmitting means configured to transmit 116; 166 the future downlink channel quality indicator fQ #1, fQ #2.

Shown is also a method for operating gNB #1 comprising, especially according to an estimation support mode ESM: receiving 216 future downlink channel quality indicator fQ #1, fQ #2 that characterizes an estimated future quality associated with a downlink channel DLCH; receiving 214 the estimation quality indicator e #1, e #2 that characterizes an estimation quality of the associated future downlink channel indicator fQ #1, fQ #2; determining 218 the transmission parameter p #2 based at least on the received the future downlink channel quality indicator fQ #1, fQ #2 and based on the estimation quality indicator e #1, e #2; and transmitting 220, via the downlink channel DLCH, downlink data d #2 in accordance with the determined transmission parameter p #2.

The example shown comprises transmitting 202 the support configuration sc indicating the support mode, especially the estimation support mode ESM.

According to an example, the estimation quality indicator e #1, e #2 is, at least at the time of its reception, valid for an RRC state exists.

There is depicted receiving 264 a further estimation quality indicator e #2 that indicates a difference with respect to the previously received estimation quality indicator e #1; and determining 265 a further transmission parameter based at least on the previously received estimation quality indicator e #1 and based on the received further estimation quality indicator e #2; and transmitting, via the downlink channel, another downlink data in accordance with the determined further transmission parameter.

For example, the estimation indicator e #2 is transmitted, if the comparison indicates a difference or change in the estimation quality indicator e #2 is significant. For example, a threshold operation decides whether the transmission is conducted or not. In another example, a pre-defined or trainable function takes both e #1 and e #2 as an input and outputs the transmission decision.

Previously received first downlink data d #1 was transmitted in accordance with a first transmission parameter p #1, different from the transmission parameter p #2.

According to an example, the method further comprises: determining 160, based at least on the monitored downlink channel quality Q #2, a further future downlink channel quality indicator fQ #2 that characterizes an estimated future quality associated with the downlink channel DLCH; determining 160, based at least on the monitored downlink channel quality Q #2, further estimation quality indicator e #2 that characterizes an estimation quality of the associated future downlink channel indicator fQ #1, fQ #2; comparing 162 the further estimation quality indicator e #2 and the previously determined estimation quality indicator e #1; and transmitting 164 the further estimation quality indicator e #2 based on the comparison.

According to an example, the support configuration sc comprises the estimation horizon EH that characterizes a time period for which the future downlink channel quality indicator fQ #1 and its associated estimation quality indicator e #1, or the support configuration sc is valid, and wherein the future downlink channel quality indicator fQ #1 and its associated estimation quality indicator e #1 are determined based on the estimation horizon EH.

There is also depicted that the support configuration sc indicates an assisting support mode ASM, wherein, according to the assisting support mode ASM, the method comprises: receiving 232 a downlink channel quality Q #3; receiving 234 assisting information AS characterizing the present or future condition of the downlink channel receiving apparatus RT; determining 236, based on the downlink channel quality Q #3 and based on the assisting information AS, a further transmission parameter p #3; and transmitting 237, via the downlink channel DLCH, downlink data d #3 in accordance with the further transmission parameter p #3.

It is shown an apparatus, especially a radio access node gNB #1 of a radio access network or a module thereof, comprising, especially according to an estimation support mode ESM: receiving means configured to receive 216 the future downlink channel quality indicator fQ #1, fQ #2 that characterizes an estimated future quality associated with a downlink channel DLCH; receiving means configured to receive 214 the estimation quality indicator e #1, e #2 that characterizes an estimation quality of the associated future downlink channel indicator fQ #1, fQ #2; determining means configured to determine 218 the transmission parameter p #2 based at least on the received future downlink channel quality indicator fQ #1, fQ #2 and based on the estimation quality indicator e #1, e #2; and transmitting means configured to transmit 220, via the downlink channel DLCH, downlink data d #2 in accordance with the determined transmission parameter p #2.

Figure 2:
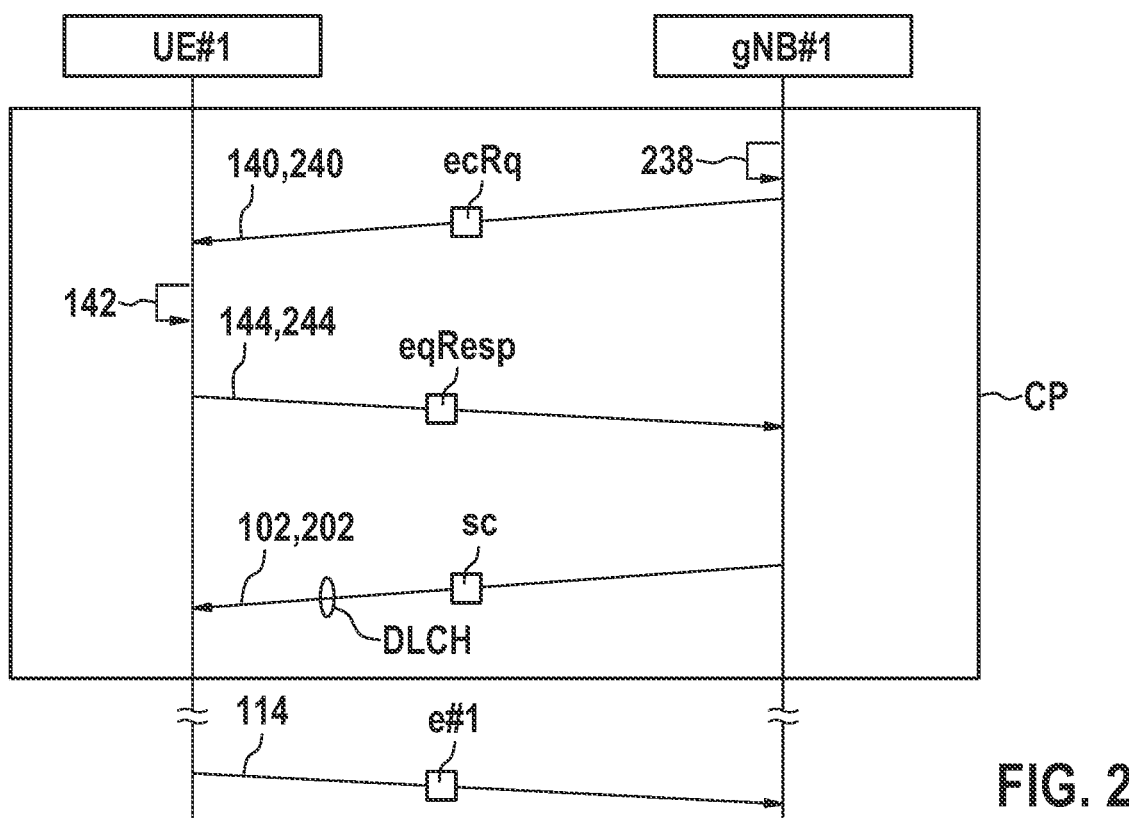
FIG. 2 depicts the configuration part CP of FIG. 1, according to an example embodiment of the preset invention.

FIG. 2 depicts the configuration part CP of FIG. 1. Shown is that the method further comprises: determining 238 an estimation capability request ecRq based on present requirements for supporting downlink channel parameter adaption; transmitting 240 an estimation capability request ecRq; receiving 242, upon transmission of the estimation capability request ecRq, an estimation capability response eqResp especially indicating at least the support mode, especially the estimation support mode ESM; wherein the support configuration sc is determined and transmitted as a reply to the transmitted estimation capability response ecResp.

There is depicted that the method for operating UE #1 comprises: receiving 140 an estimation capability request ecRq; determining 142, upon reception of the estimation capability request ecRq, an estimation capability response eqResp especially indicating at least the support mode, especially the estimation support mode ESM; transmitting 144 the estimation capability response ecResp; and wherein the support configuration sc is received as a reply to the transmitted estimation capability response ecResp.

The example shown is characterized in that the support configuration sc comprises the estimation horizon EH that characterizes a time period for which the future downlink channel quality indicator fQ #1 and its associated estimation quality indicator e #1, or the support configuration sc is or should be valid, and wherein the future downlink channel quality indicator fQ #1 and its associated estimation quality indicator e #1 are determined based on the estimation horizon EH.

For example, in case gNB #1 is embodied as a satellite, gNB #1 uses the knowledge of its own trajectory and constellation to define the prediction horizon and signal it in the support configuration sc.

As an alternative or additionally, the apparatus UE #1 determines the estimation horizon EH.

Figure 3:
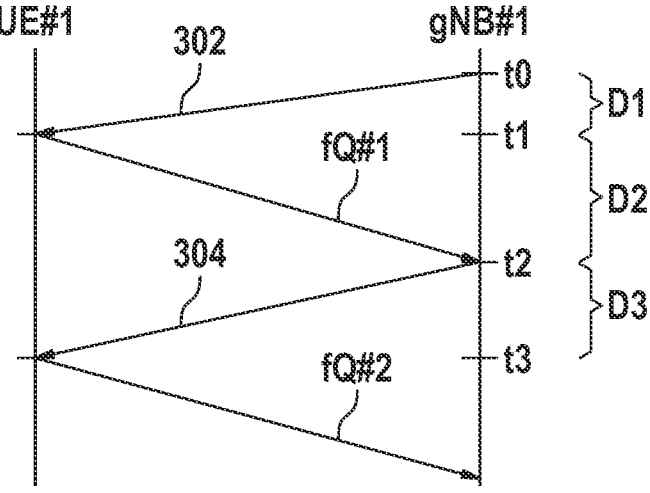
FIG. 3 depicts signaling for downlink transmission, according to an example embodiment of the present invention.

FIG. 3 depicts signaling for downlink transmission. The apparatus gNB #1 performs downlink transmissions 302, 304. The apparatus UE #1 measures the downlink channel quality, for example in terms of RSRP/RSRQ/RSSI and derives the future downlink channel quality indicator in form of an estimate of the CQI, PMI and RI. The future downlink channel quality indicator is sent back to the BS.

The transmission starts at to. A measurement of Q #1 is taken at t1. The estimated downlink channel quality indicator f #Q1 is received at gNB #1 at time t2. Please note that the time between transmission and reception of the data on the downlink is denoted as D1 and the transmission delay on the uplink is denoted D2. Please note that in non-terrestrial networks, NTN, the gNB #1, i.e., the satellites are moving very fast. Similarly, the UE is moving considerably fast in vehicular applications.

Thus, D1!=D2. Furthermore, for the next downlink transmission a different delay D3 is assumed, therefore D1!=D2!=D3. In state of the art, the DL transmission is changed based on D1. However as D2+D3 cannot be neglected anymore, it is expected that D1 and D2 will differ significantly.

In contrast to sending the actual measurements at t1, the expected channel conditions in the future are transmitted in form of fQ #1 towards gNB #1.

Figure 4:
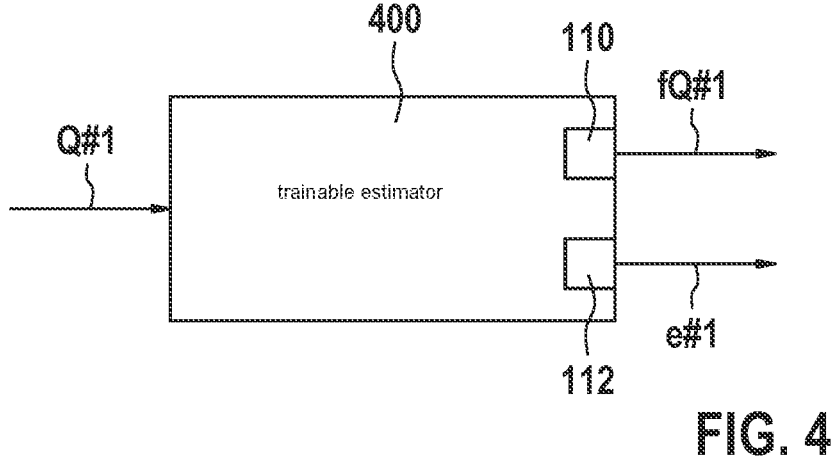
FIG. 4 depicts a schematic block diagram of a machine-trained function or estimator 400, according to an example embodiment of the present invention.

FIG. 4 depicts a schematic block diagram of a machine-trained function or estimator 400. The trainable estimator 400 receives input data, for example comprising Q #1. Based on the input data Q #1, the machine-trained estimator 400 derives fQ #1, for example a predicted CQI. In addition, the device also outputs e #1 associated with Q #1, wherein e #1 can be also termed prediction accuracy identifier, PAI. According to another example, fQ #1 and e #1 are determined separately.

Figure 5:
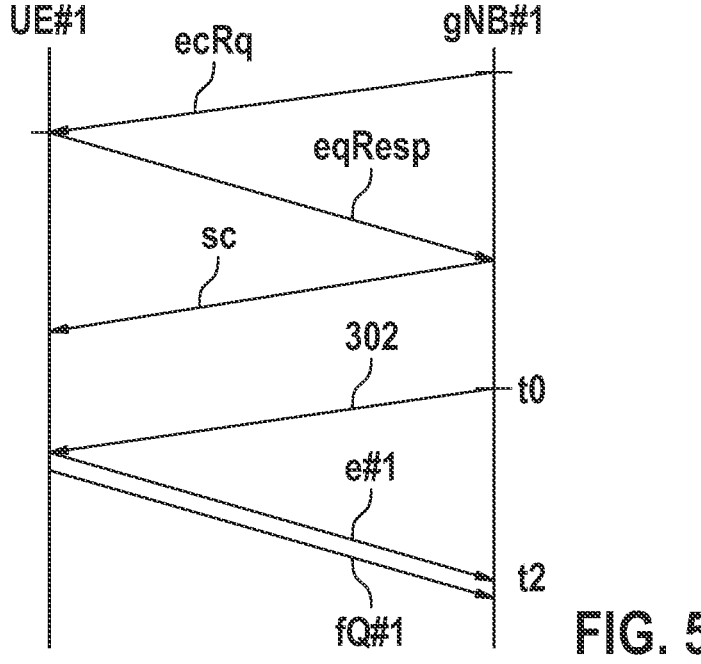
FIG. 5 depicts a schematic sequence diagram, according to an example embodiment of the present invention.

FIG. 5 depicts a schematic sequence diagram. On connection establishment, the apparatus gNB #1 transmits ecRq to the UE #1/UE. UE #1 sends a response in form of rqResp if it provides prediction capabilities/estimation capabilities. If UE #1 does not provide estimation capabilities, it returns to gNB #1 a failure.

Assuming an ACK was sent via rqResp to gNB #1, gNB #1 informs UE #1 about the actual prediction task via the support configuration sc. The support configuration sc contains at least one of the following: Type of task like classification or regression; Estimation Horizon; Request to signal a estimation accuracy class; a dedicated parameter for which a prediction/estimation is desired, wherein the parameter is one of: channel quality indicator COI, 5QI, 6QI, precoding matrix indicator PMI, rank indicator RI. A classification task is, for example, a determination of a discrete value, for example the QCI. A regression task is, for example, a prediction of a continuous value, for example the RSSI.

The gNB #1 checks the support configuration sc and evaluates its capabilities based on the requirements. The gNB #1 then transmits e #1, which can be termed a Session-PAI S-PAI. The S-PAI could be for example an X-bit indicator giving some kind of granularity regarding:

1. the expected mean square error, MSE, i.e., variance for regression task; and
2. cross-entropy loss, CE, i.e., the probability of an erroneous class assignment.

According to the following table, gNB #1 is able to derive MSE or CE based on the received or presently valid estimation quality e #n. MSE, CE or any other comparable value represents a measure on how reliable the associated downlink quality indicator is.

TABLE 1

| PAI/e#1 . . . n | MSE | CE |
|---|---|---|
| 0 (highest) | <1e−3 | <1e−6 |
| 1 | <1e−2 | <1e−4 |
| X (worst) | >1e−2 | >1e−3 |

The example shown concerns that the estimation quality indicator e #1 and the associated future downlink channel quality indicator fQ #1 are transmitted pairwise.

This example can be also referred to as a per-prediction reliability reporting. gNB #1 sends the request ecRq on connection establishment. However, e #1 is not attached to the session. On ACK reception gNB #1 sends out the support configuration sc. gNB #1 does not report e #1 for the session but the predicted measurement fQ #1 contains e #1 in the measurement report as an extra field.

Figure 6:
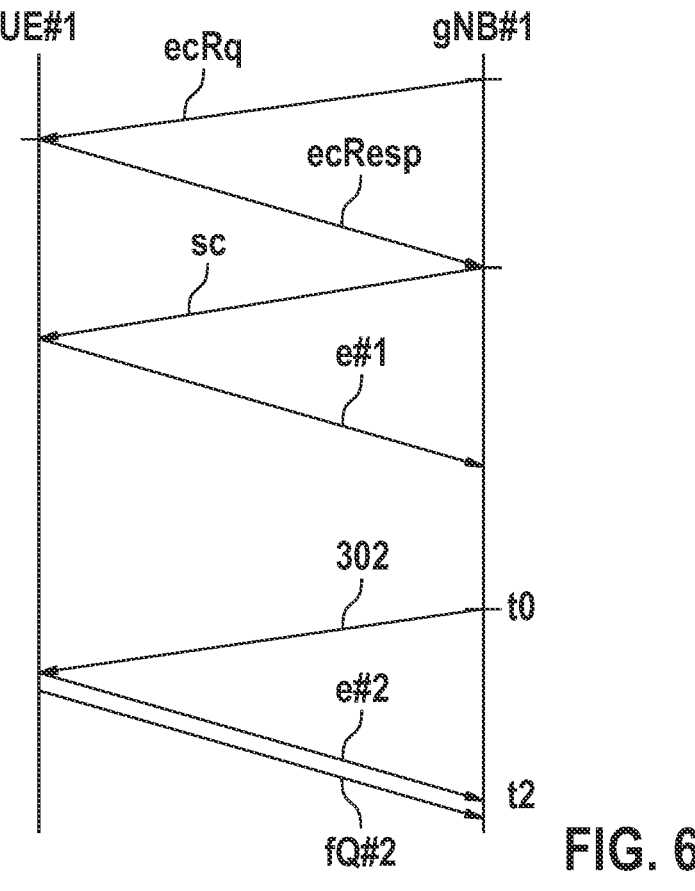
FIG. 6 depicts reporting of a sudden difference in reliability compared to previously valid reliability signaled via e #1, according to an example embodiment of the present invention.

FIG. 6 depicts reporting of a sudden difference in reliability compared to previously valid reliability signaled via e #1. As the radio conditions and environmental conditions change unexpectedly and the requirements indicated in e #1 can no longer be satisfied, UE #1 signals e #2, which represents a difference to e #1. e #2 could be a small integer, represented with few bits. It can represent for example:

[−2] reduce accuracy from e #1 by 2,
[−1] reduce accuracy from e #1 by 1,
[+1] increase accuracy from e #1 by 1,
[+2] increase accuracy from e #1 by 2.

Figure 7:
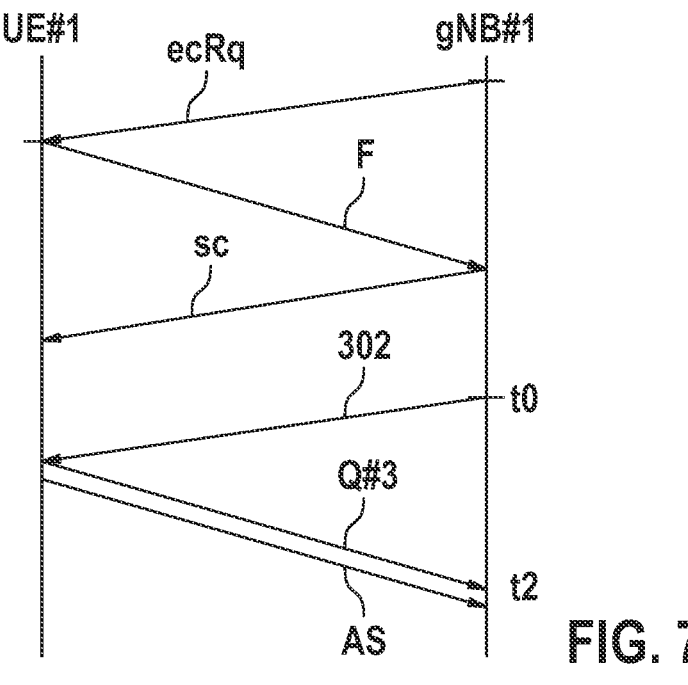
FIG. 7 depicts the assisting support mode ASM from FIG. 1, according to an example embodiment of the present invention.

FIG. 7 depicts the assisting support mode ASM from FIG. 1. Under certain conditions, the radio terminal UE #1/UE has no prediction capabilities. In this case, UE #1 responds to the ecRq with a failure F. In this case, gNB #1 can reply with the support configuration sc or separate request to assist the prediction procedure on the side of gNB #1 by transmitting the assisting information AS.

According to an example, conditional prediction at the side of gNB #1 enhances UE prediction capabilities. Let us consider the case where the UE/RT is capable of providing fQ #1 but the associated e #1 might not allow the intended operation at the side of gNB #1. In this case, gNB #1 can additionally request assisting information despite the pCQI request was responded. In this case, the blocks ESM and ASM of FIG. 1 are executed sequentially and not alternatively.

A legacy device can be detect if the ecRq is replied with a failure and also the request for assisting information results in a failure.

Figure 8:
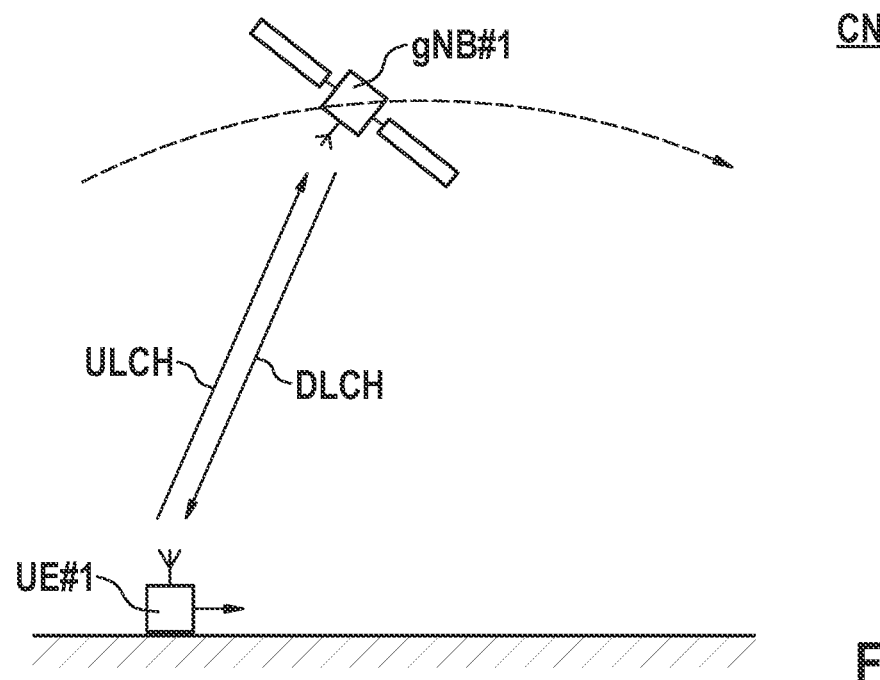
FIG. 8 depicts a non-terrestrial cellular communications network CN #1, according to an example embodiment of the present invention.

FIG. 8 depicts a non-terrestrial cellular communications network CN #1. The radio access node gNB #1 is attached to a satellite. Radio Terminal UE #1 resides on the ground and moves relatively slowly compared to the gNB #1 as indicated by the arrows. Because of the relative movement to each other, both the uplink radio channel ULCH and the downlink radio channel DLCH are subject to possible quality degradations.

In future communication systems, the combination of terrestrial and non-terrestrial networks improve coverage and thus availability of the respective communication network, in particular in rural areas. In contrast to classical terrestrial networks, deploying part of the network in space results in multiple new challenges. The satellites serving the terrestrial UEs are not located in the geo-stationary orbit but rather on lower orbits. This is allowing for reduced round-trip-time latency compared to geo-stationary satellites, as the relative distance is shorter. Nevertheless, the latency is still considerably larger compared to propagation delays observed in typical terrestrial deployments.

As CN #1 can be seen as an extension to terrestrial networks, in certain areas underground, tunnel, bridge, etc. the CN #1 coverage might be suddenly degraded. These sporadic events depend on the geographic location of the UE and its relative position to the satellite. Therefore, probabilistic channel models as used in literature will be insufficient for designing appropriate predictors. Thus, data driven approaches do not require a closed form channel model but instead can be trained to realistic propagation scenarios.

Figure 9:
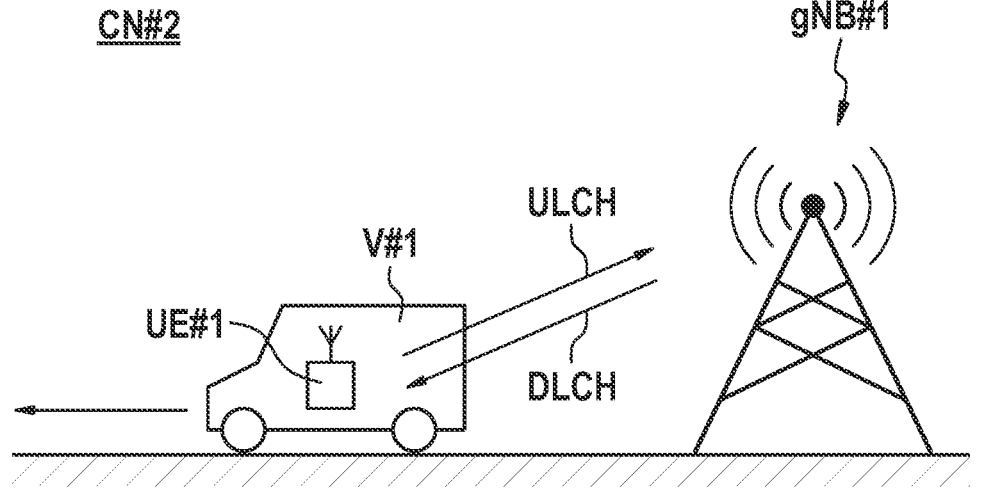
FIG. 9 depicts a terrestrial cellular radio communications network CN #2, according to an example embodiment of the present invention.

FIG. 9 depicts a terrestrial cellular radio communications network CN #2. In this case, gNB #1 has a fixed position on ground and UE #1 moves as being part of a vehicle V #1. In addition, in this case, due to the relative movement ULCH and DLCH are subject to potential degradations. Moreover, UE #1 may lose its connection to gNB #1 if V #1 enters a tunnel or moves in the vicinity of further obstacles like trees or buildings that affect downlink quality.

As shown in FIGS. 8 and 9, the relative movements and probable future degradation of the downlink motivate the methods described herein.

Figure 10:
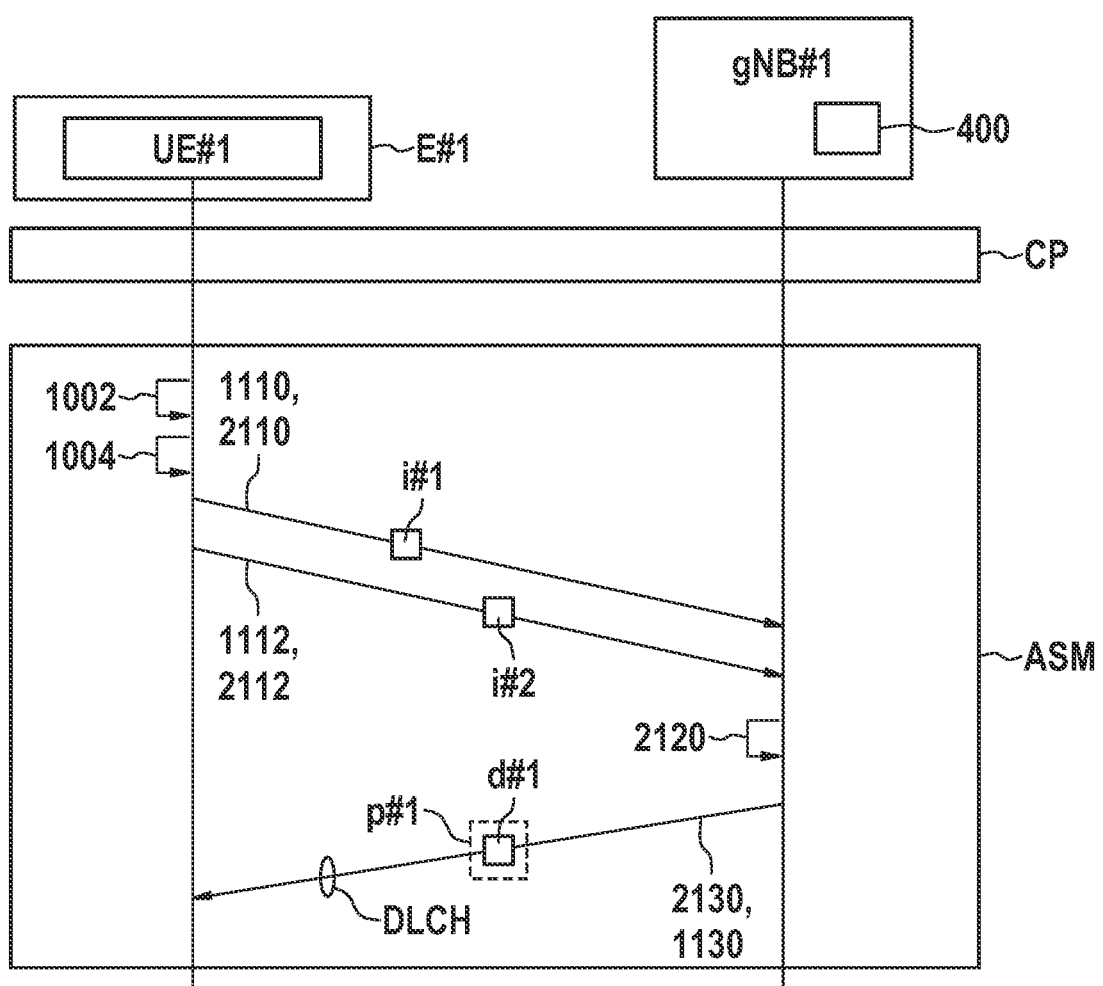
FIG. 10 depicts a further example of the assisting support mode ASM of FIG. 1 in a schematic sequence diagram, according to an example embodiment of the present invention.

FIG. 10 depicts a further example of the assisting support mode ASM of FIG. 1 in a schematic sequence diagram.

According to a step 1002, UE #1 determines a first information i #1, for example measuring the quality Q #1 of the received or observed downlink channel DLCH. In other words, the first information i #1 could be based on or is a passive radio-based measurement, for example RSRP, RSSI, RSRQ, or a Doppler measurement.

According to a step 1004, UE #1 determines second information i #2, for example ego-sensor information. The ego-sensor information comprises or is based on at least one of image data from Lidar/Radar/Camera, Vehicle heading, Vehicle speed, Route information, Way-points, Map information.

The figure concerns a method for operating UE #1 comprising: transmitting 1110 first information i #1 that characterizes at least one quality associated with a downlink channel DLCH received by a radio terminal UE #1; transmitting 1112 second information i #2 that characterizes a present or future environmental situation of the physical entity E #1 that is associated with the radio terminal UE #1.

In other words, the second information i #2 is determined using at least one sensor that is arranged at or in the vicinity of a physical entity E #1. The physical entity E #1 could be an automotive vehicle or an industrial equipment to which UE #1 is attached or at least functionally coupled to. The second information can be also termed assisting information as the second information assists the gNB in determining the transmission parameter for downlink transmissions.

The second information i #2 characterizing environmental situation can be directed to a presently determined sensor information or information that is based at least partly on sensor information from a sensor attached to the physical entity or the radio terminal. Moreover, the second information can be associated with a present situation and/or a future situation. In case of a route information, the second information includes the future situation. In addition, in case, that sensor information like a camera picture depicts a tunnel entrance, the second information includes the future situation, namely a possible communication degradation after entering the tunnel entrance.

An example concerns a method for operating qNB #1 comprising: receiving 2110 first information i #1 that characterizes the quality associated with a downlink channel DLCH received by an apparatus UE #1; receiving 2112 second information i #2 that characterizes a present or future environmental situation of a physical entity E #1 which is associated with the apparatus UE #1. determining 2120, via the machine-trained function 400, the downlink transmission parameter p #A based on the first information i #1 and based on the second information i #2; and transmitting 2130 downlink data d #A via the downlink channel DLCH in accordance with the determined downlink transmission parameter p #A. Accordingly, UE #1 receives 1130 downlink data d #A with an increased downlink quality.

There is illustrated the apparatus gNB #1, especially a radio access node of a radio access network or a module thereof, comprising: receiving means to receive 2110 first information i #1 that characterizes at least one quality associated with a downlink channel DLCH received by an apparatus UE #1; receiving means to receive 2112 second information i #2 that characterizes a present or future environmental situation of a physical entity E #1 which is associated with the apparatus UE #1. determining means to determine 2120, via the machine-trained function 400, the downlink transmission parameter p #A based on the first information i #1 and based on the second information i #2; and transmitting means to transmit 2130 downlink data d #A via the downlink channel DLCH in accordance with the determined downlink transmission parameter p #A.

There is depicted the apparatus UE #1, especially a radio terminal or user equipment or a module thereof, comprising: transmitting means to transmit 1110 the first information i #1 that characterizes at least one quality associated with the downlink channel DLCH received by the radio terminal or apparatus UE #1; transmitting means to transmit 1112 second information i #2 that characterizes a present or future environmental situation of a physical entity E #1 that is associated with the radio terminal or apparatus UE #1.

Figure 11:
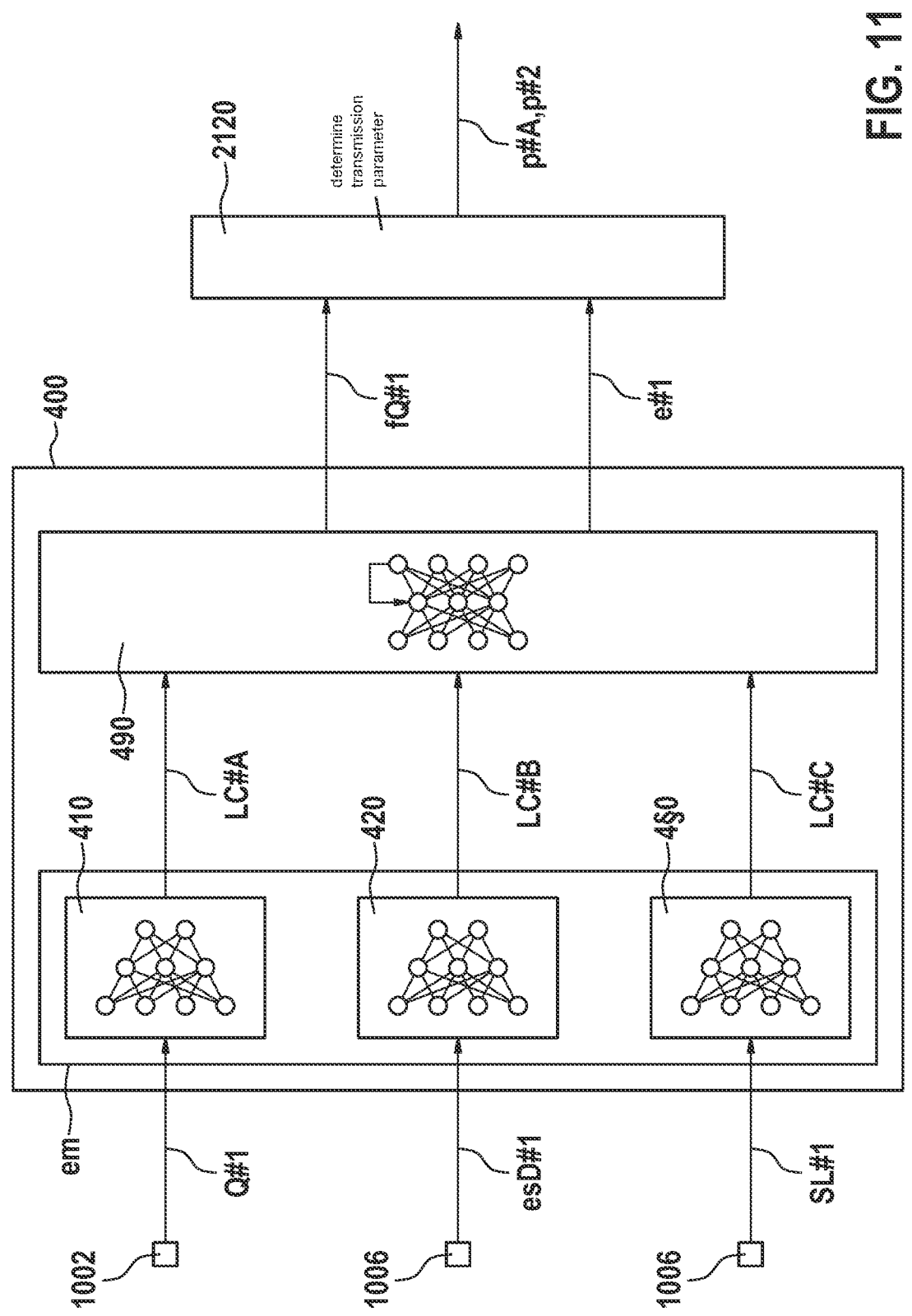
FIG. 11 depicts an example of the machine-trained function 400 of FIG. 4, according to the present invention.

FIG. 11 depicts an example of the machine-trained function 400 of FIG. 4, which can be implemented at the UE #1, gNB #1 or implemented in a distributed manner between one or more UE #1 . . . n and gNB #1 as exemplified in the following.

There is illustrated that the method comprises: determining, via a machine-trained downlink-embedding function 410, a first latent code LC #A based on the downlink channel quality Q #1; determining, via a machine-trained assisting-data embedding function 420, a second latent code LC #B based on ego-sensor based data esD #1; determining, via a machine-trained prediction function 490, the future downlink channel indicator fQ #1 and the least one estimation quality indicator e #1 based at least on the first latent code LC #A and based on the second latent code LC #B.

There is depicted that the method further comprises: observing 1006 a parameter SL #1 associated with a sidelink channel SLCH; determining, via a machine-trained sidelink-embedding function 430, a third latent code LC #C based on the parameter SL #1 associated with the sidelink channel SLCH; and wherein the future downlink channel indicator fQ #1, fQ #2 and the estimation quality indicator e #1, e #2 are further determined based on the third latent code LC #C.

Additionally to the steps 1002, 1004, a step 1006 is shown. According to step 1006 the parameter SL #1 associated with the sidelink channel is determined. SL #1 can be also called sidelink assisted information and can originate, for example, from road side units, RSUs, and/or nearby vehicles and may include sensor sharing. Example of SL #1 include: a relative position information, COI at UEs connected over Sidelink.

In an exemplary scenario, the ego-sensors provide additional information in form of esD #1 by observing the environment. For example, the camera or LIDAR detects trees or the entrance to a tunnel, which can cause very sudden and considerable changes in the channel characteristics. Therefore, esD #1 is considered to represent or describe the present or future environmental condition of the physical entity, the apparatus UE #1 is connected to or coupled with.

In front of a prediction function 490, there is arranged an embedding layer em. The embedding layer em maps respective high-dimensional features into a respective low-dimensional latent space. The raw inputs like Q #1, esD #1, SL #1 have a high inter-feature correlation. For example, RSSI, RSRP and RSRQ are closely related. Likewise, an object observed through LIDAR might be detected by the camera as well. The embedding layer em serves as a pre-filtering step, where the relevant information is extracted. The raw inputs Q #1, esD #1, SL #1 are separated from the predictor function 490. In turn, the prediction function 490 is more robust against variations to the raw inputs. For example, if a different type of LIDAR sensor or similar is used.

The prediction function 490 is realized, for example, as a recurrent neural network, which is well suited to capture temporal input sequences. Particular implementations of the prediction function 490 comprise Long Short-Term Memory, LSTM, or a Continuous-Discrete Recurrent Kalman Network, CDRKN.

The machine-trained downlink-embedding function 410 determines first latent code LC #a based on Q #1. The function 410 is embodied as a deep neural network.

A machine-trained assisting-information-embedding function 420 determines second latent code LC #B based on esD #1. The function 420 is embodied as a deep neural network.

A machine-trained sidelink-embedding function 430 determines third latent code LC #C based on SL #1. The function 430 is embodies as a deep neural network.

There are several ways to train the network structure of the function 400. For example, for offline supervised training, the training apparatus has access to a huge dataset and is therefore able to capture different sensor inputs for different settings as well as radio measurements between satellites and UEs, in case of non-terrestrial application, to provide a well-trained model.

In case of online self-supervised training UE #1 and/or gNB #1 start with a warmup-phase where no prediction is done. It saves its own observation from the past to build up a local dataset.

This dataset will grow over time and is matched to the available sensors at the side of UE #1. UE #1 then checks its own predictions in form of fQ #1 and e #1 with the actual observed associated samples Q #2 in the future. Thus, it can perform self-supervised training.

As another embodiment, training Joint Federated Learning is done in a distributed manner. Instead of training on one big global dataset, training is done at different entities based on local datasets. In turn, the training could be done in parallel. This shortens the time-consuming process of extensive data-collection/data-storage and data-sharing prior to training.

The example shown concerns that the method further comprises: determining, via the machine-trained function 490, future downlink channel quality indicator fQ #1, fQ #2 that characterizes an estimated future quality associated with the downlink channel DLCH and estimation quality indicator e #1, e #2 that characterizes an estimation quality of the associated future downlink channel indicator fQ #1, fQ #2 based at least on the first information and based on at least the second information; and determining 2120 the transmission parameter p #A based at least on the future downlink channel quality indicator fQ #1, fQ2 and based on the estimation quality indicator e #1, e #2. In other words, according to an example, processing of LC #C and/or SL #1 are optional.

The determining 2120 is for example a mapping function, which maps received pairs of fQ #1 and e #1 to a corresponding p #A. Therefore, a lookup table can be applied for determining 2120. In another example, a further machine-trained mapping function is used for determining 2120. Furthermore, the transmission parameter p #A comprises at least one of the following: a modulation and coding scheme, a transmission power, etc.

Figures 12, 13:
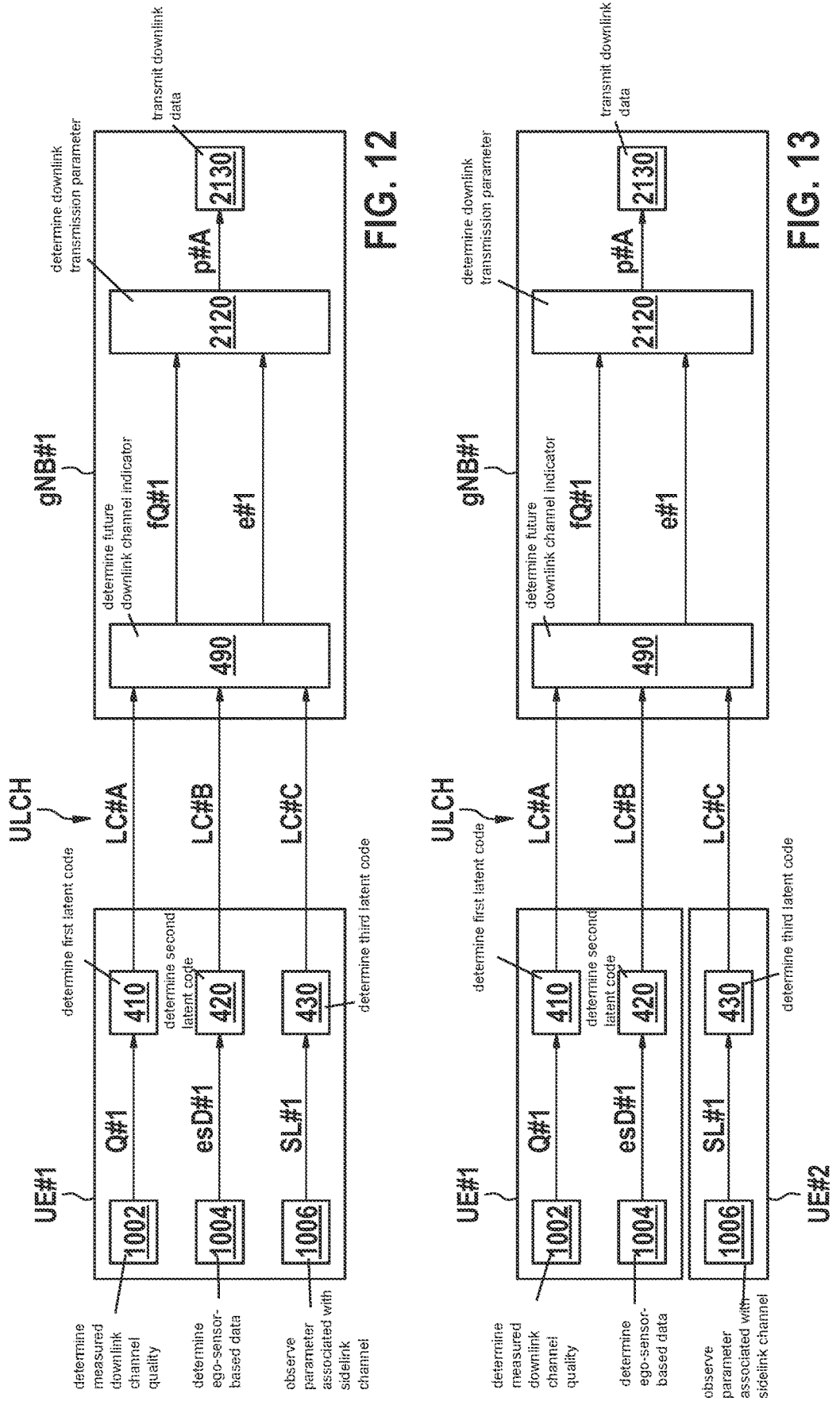
FIG. 12 depicts an example of the distribution of the different functional entities between UE #1 and gNB #1, according to an example embodiment of the present invention.
FIG. 13 depicts another example of the distribution of the different functional entities, according to an example embodiment of the present invention.

FIG. 12 depicts an example of the distribution of the different functional entities between UE #1 and gNB #1. Data transmissions from UE #1 to gNB #1 are done via the uplink channel ULCH.

There is depicted that the transmitted first information i #1 is a first latent code LC #A, wherein the method further comprises: determining 1002 the measured downlink channel quality Q #1 from observing a downlink channel DLCH; and determining, via a machine-trained downlink-embedding function 410, the first latent code LC #A based on the measured downlink channel quality Q #1.

There is illustrated that the transmitted second information i #1 is a second latent code LC #B, wherein the method further comprises: determining 1004 ego-sensor-based data esD #1 based on the sensor measurement associated with the physical entity; and determining, via a machine-trained assisting-information-embedding function 420, the second latent code.

There is illustrated in an example that the method further comprises: transmitting third information that characterizes the parameter SL #1 associated with the sidelink channel SLCH.

Shown is that the transmitted third information is a third latent code LC #C, wherein the method further comprises: observing 1006 the parameter associated with the sidelink channel SLCH; and determining, via a machine-trained sidelink-embedding function 430, the third latent code LC #B based on the parameter SL #1 associated with the sidelink channel SLCH.

The figure concerns that the received first information i #1 is a first latent code LC #A, and wherein the second information i #2 is a second latent code LC #B, wherein the method further comprises: determining, via a machine-trained predictor function 490, the downlink transmission parameter p #A based on the received first latent code LC #A and based on the received second latent code LC #B.

The FIGS. 12 to 17 show example of different implementations of the machine-trained function 400. However, as some implementations at least partly overlap, the respective wording can be applied to a corresponding part of another implementation.

FIG. 13 depicts another example of the distribution of the different functional entities. In contrast to FIG. 12, FIG. 13 comprises a further apparatus UE #2 that determines the third latent code LC #C and transmits LC #C towards gNB #1.

There is illustrated that the received first information i #1 is the downlink channel quality Q #1, and wherein the second information i #2 is a second latent code LC #B, wherein the method further comprises: determining, via a machine-trained downlink-embedding function 410, a first latent code LC #A based on the received downlink quality Q #1; determining 490, via a machine-trained predictor function, the downlink transmission parameter p #A based on the determined first latent code LC #A and based on the received second latent code LC #B.

There is illustrated that the received third information is a third LC #C latent code, wherein the method further comprises: determining, via the machine-trained function, the downlink transmission parameter based at least one the third latent code LC #C.

Figures 14, 15:
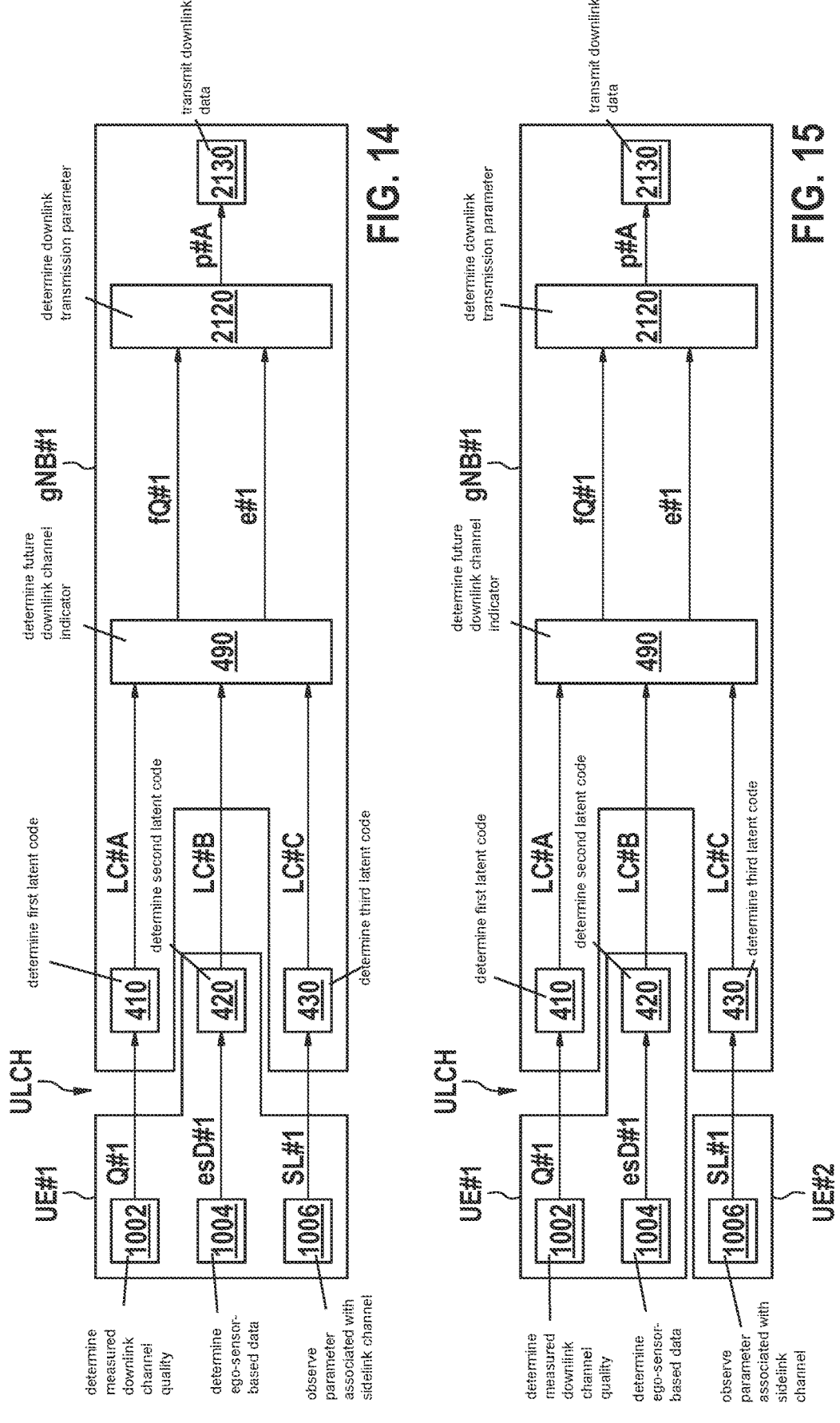
FIG. 14 depicts another example of the function distribution, according to the present invention.
FIG. 15 depicts that the further apparatus UE #2 transmits SL #1 to gNB #1, according to an example embodiment of the preset invention.

FIG. 14 depicts another example of the function distribution. In contrast to FIGS. 12 and 13, FIG. 14 depicts that latent code LC #B is transmitted only, wherein latent codes LC #A and LC #C are determined at gNB #1.

FIG. 14 depicts another example of the function distribution. In contrast to FIGS. 12 and 13, FIG. 14 depicts that latent code LC #B is transmitted only, wherein latent codes LC #A and LC #C are determined at gNB #1.

Shown is that the method for operating UE #1 further comprises: observing 1006 the parameter SL #1 associated with the sidelink channel SLCH, wherein the transmitted third information i #3 is the sidelink parameter SL #1 associated with the sidelink channel SLCH.

The figure concerns that the transmitted first information Q #1 is the measured downlink channel quality Q #1, wherein the method for operating UE #1 further comprises: determining the measured downlink channel quality Q #1 from observing a downlink channel DLCH.

There is shown that the received first information is the first latent code LC #A, and wherein the second information is ego-sensor based data esD #1, wherein the method for operating UE #1 further comprises: determining, via a machine-trained assisting-data-embedding function 420, the second latent code LC #B based on the received ego-sensor based data esD #1; determining, via a machine-trained predictor function 490, the downlink transmission parameter p #A based on the determined first latent code LC #A and based on the received second latent code LC #B.

Shown is that the method for operating gNB #1 further comprises: receiving third information that characterizes the parameter SL #1 associated with the sidelink channel SLCH.

Shown is that the received third information is the sidelink parameter SL #1 associated with the sidelink channel SLCH, wherein the method for operating gNB #1 further comprises: determining, via a sidelink-embedding machine-trained function 430, the third latent code LC #C, and determining, via the machine-trained function 490, the downlink transmission parameter p #A based at least on the third latent code LC #C.

FIG. 15, in contrast to FIG. 14 to which is referred to for the other features, depicts that the further apparatus UE #2 transmits SL #1 to gNB #1.

Figures 16, 17:
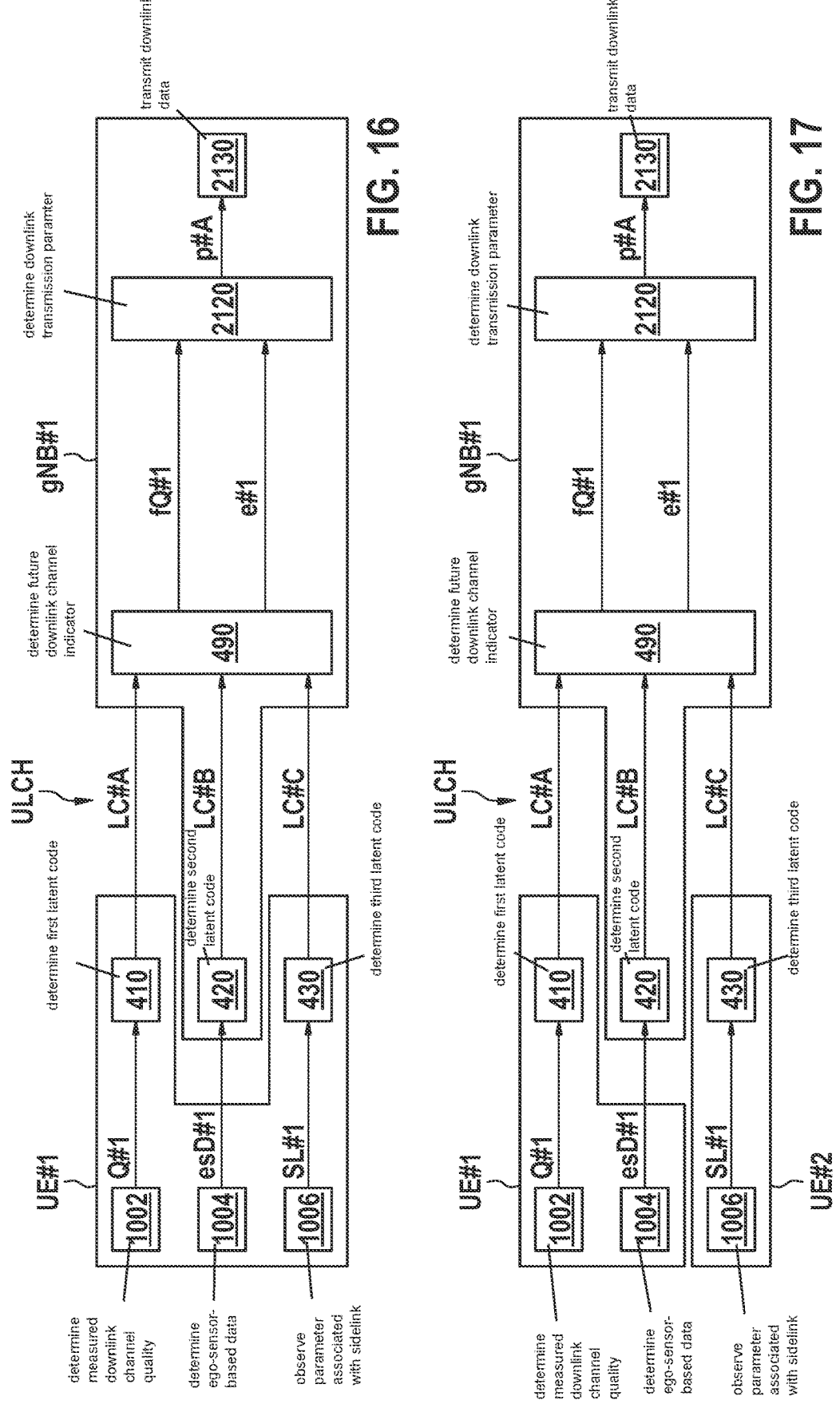
FIG. 16 depicts another example of the function distribution, according to an example embodiment of the present invention.
FIG. 17 depicts that the further apparatus UE #2 transmits the latent code LC #C instead of UE #1, according to an example embodiment of the present invention.

FIG. 16 depicts another example of the function distribution. Latent code LC #A is transmitted to gnB #1, whereas LC #B is determined at the side of gNB #1.

The example shown concerns that the transmitted second information esD #1 is ego-sensor-based data esD #1, wherein the method for operating UE #1 further comprises: determining 1004 the ego-sensor-based data esD #1 based on at least one sensor measurement of a sensor associated with the physical entity.

FIG. 17 depicts, in contrast to FIG. 16, that the further apparatus UE #2 transmits the latent code LC #C instead of UE #1.

Figure 18:
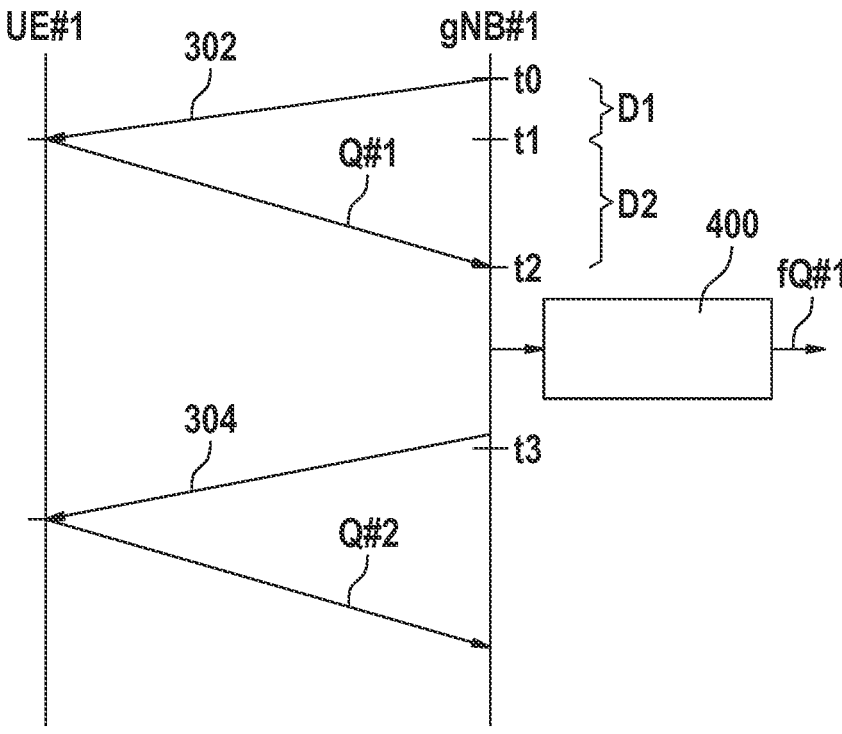
FIG. 18 depicts that the machine-trained function 400 is arranged at the apparatus gNB #1, according to an example embodiment of the present invention.

FIG. 18 depicts, in contrast to FIG. 3, that the machine-trained function 400 is arranged at the apparatus gNB #1. For example, if UE #1 is not able or not configured to perform prediction of Q #1, Q #2 and so on, UE #1 signals gNB #1 that no prediction can be provided. Assuming gNB #1 has more processing power, gNB #1 is capable to compute fQ #1 . . . n itself based at least one Q #1 provided.

In the context of non-terrestrial networks, NTN, gNB #1 is a satellite and computational resources might be limited as well. Thus, prediction of fQ #1 . . . n is envisioned at least partly at the radio access network, an edge-server or similar. That is, in general, depending on the available resources the determination of fQ #1 can be distributed between terminal devices like UE #1 and devices of the radio access network.

Figure 19:
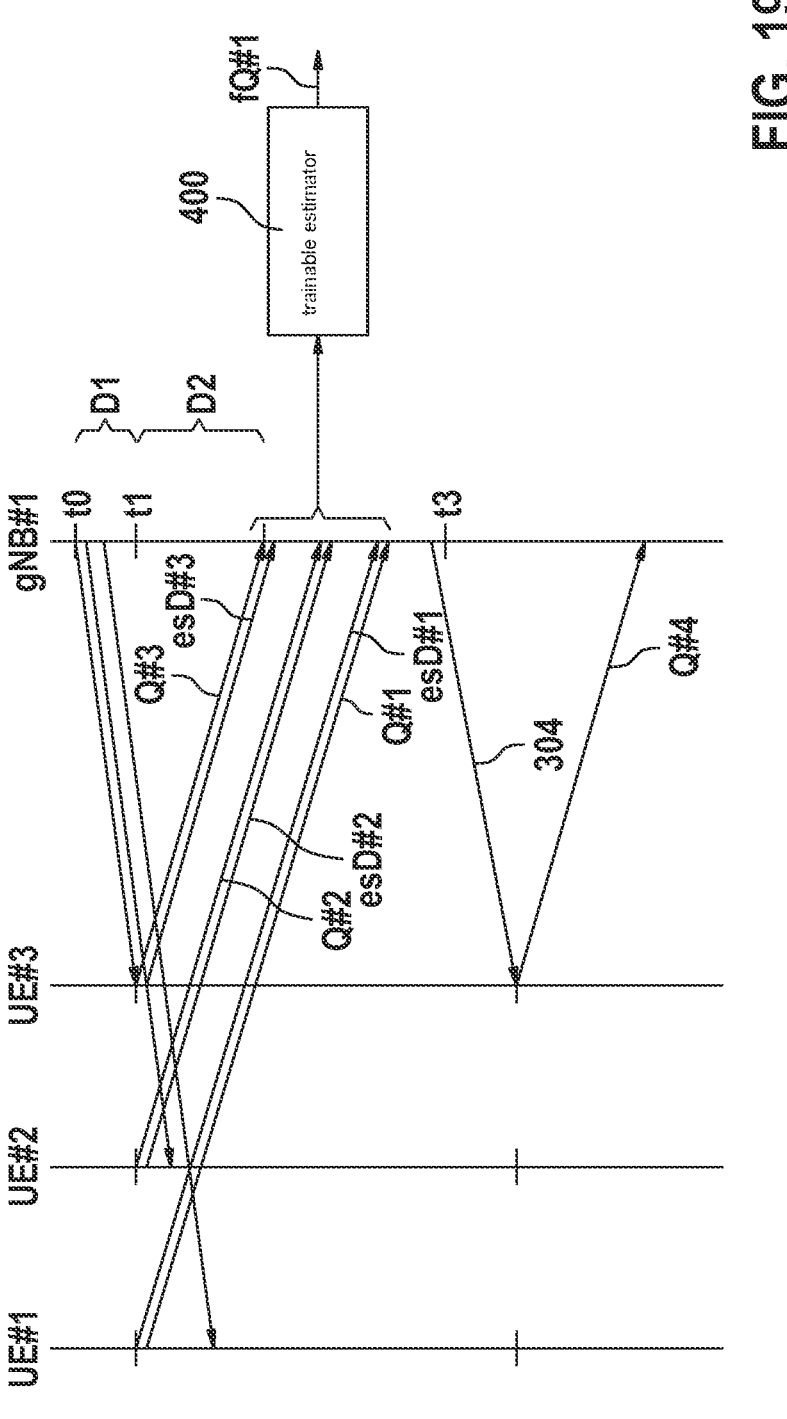
FIG. 19 depicts that several apparatuses UE #1, UE #2, UE #3 transmit its respective measured downlink channel quality Q #1, Q #2, Q #2 along with assisting information in form of respective ego-sensor-based data esD #1, esD #2, esD #3, according to an example embodiment of the present invention.

FIG. 19 depicts, in addition to FIG. 18, that several apparatuses UE #1, UE #2, UE #3 transmit its respective measured downlink channel quality Q #1, Q #2, Q #2 along with assisting information in form of respective ego-sensor-based data esD #1, esD #2, esD #3. The former data serves as an input for the function 400 at the apparatus gNB #1. The transmission 304 is based on the transmission parameter, which is determined based on fQ #1.

In contrast to UE #1, gNB #1 is not expected to have direct access to the ego-sensors of UE #1. However, if possible, UE #1 might report the additional assisting information in form of esD #1 or latent code LC #C. Accordingly the ego-sensor information can be pre-processed and/or compressed before transmission. This allows us to also share possible sensitive private sensor information. In addition, gNB #1 can leverage the reports sent from several apparatuses UE #1-3 in the vicinity.

What is claimed is:

1. A method, comprising the following steps:

monitoring at least one downlink channel;

determining at least one downlink channel quality associated with the monitored at least one downlink channel;

determining, based at least on the at least one monitored downlink channel quality, at least one future downlink channel quality indicator that characterizes an estimated future quality associated with the downlink channel;

determining, based at least on the at least one monitored downlink channel quality, at least one estimation quality indicator that characterizes an estimation quality of the at least one associated future downlink channel indicator;

determining, via a machine-trained downlink-embedding function, a first latent code based on the at least one downlink channel quality;

determining, via a machine-trained assisting-data embedding function, a second latent code based on assisting data;

determining, via a machine-trained prediction function, the at least one future downlink channel indicator and the least one estimation quality indicator based at least on the first latent code and/or the second latent code;

transmitting the at least one estimation quality indicator; and transmitting the at least one future downlink channel quality indicator.

2. The method according to claim 1, further comprising:

receiving a support configuration indicating at least one support mode.

3. The method according to claim 2, wherein the at least one support mode includes an estimation support mode.

4. The method according to claim 2, further comprising:
receiving an estimation capability request;
determining, upon reception of the estimation capability request, an estimation capability response indicating at least at least one support mode; and
transmitting the estimation capability response;
wherein the support configuration is received as a reply to the transmitted estimation capability response.

5. The method according to claim 2, wherein the support configuration indicates an assisting support mode, wherein, according to the assisting support mode, the method further comprises:
monitoring the at least one downlink channel;
determining the at least one downlink channel quality associated with the monitored at least one downlink channel; and
transmitting the at least one downlink channel quality.

6. The method according to claim 5, wherein, according to the assisting support mode, the method further comprises:
determining assisting information characterizing at least one present or future condition of a downlink channel receiving apparatus or of a physical entity the receiving apparatus is associated or mounted to; and
transmitting the assisting information.

7. The method according to claim 1, wherein the at least one estimation quality indicator is, at least at a time of its transmission, valid for an undetermined period of time including for a time period an RRC state is active.

8. The method according to claim 1, wherein the assisting data comprises ego-sensor based data.

9. The method according to claim 1, further comprising:
determining, via the machine-trained prediction function, the at least one future downlink channel indicator and the least one estimation quality indicator based at least on the first latent code and the second latent code.

10. An apparatus, including a radio terminal or user equipment or a module of a radio terminal or user equipment, comprising:
at least one processor configured to:
determine at least one downlink channel quality associated with at least one downlink channel;
determine, based at least on the at least one downlink channel quality, at least one future downlink channel quality indicator that characterizes an estimated future quality associated with the downlink channel;
determine, based at least on the at least one monitored downlink channel quality, at least one estimation quality indicator that characterizes an estimation quality of the at least one associated future downlink channel indicator;
determine, via a machine-trained downlink-embedding function, a first latent code based on the at least one downlink channel quality;
determine, via a machine-trained assisting-data embedding function, a second latent code based on assisting data; and
determine, via a machine-trained prediction function, the at least one future downlink channel indicator and the least one estimation quality indicator based at least on the first latent code and/or the second latent code;
a transmitter configured to transmit the at least one estimation quality indicator; and
a transmitter configured to transmit the at least one future downlink channel quality indicator.

11. A method, comprising the following steps:
receiving at least one future downlink channel quality indicator that characterizes an estimated future quality associated with a downlink channel;
receiving at least one estimation quality indicator that characterizes an estimation quality of the at least one associated future downlink channel indicator;
determining at least one transmission parameter based at least on the received at least one future downlink channel quality indicator and based on the at least one estimation quality indicator; and
transmitting, via the downlink channel, downlink data in accordance with the determined at least one transmission parameter,
wherein the at least one future downlink channel indicator and the at least one estimation quality indicator are determined based at least on a first latent code and/or a second latent code, the first latent code determined based on at least one downlink channel quality and the second latent code determined based on assisting data.

12. The method according to claim 11, further comprising:
transmitting a support configuration indicating at least one support mode including an estimation support mode.

13. The method according to claim 12, further comprising:
determining an estimation capability request based on present requirements for supporting downlink channel parameter adaption;
transmitting an estimation capability request;
receiving, upon transmission of the estimation capability request, an estimation capability response indicating at least one support mode;
wherein the support configuration is determined and transmitted as a reply to the transmitted estimation capability response.

14. The method according to claim 12, wherein the support configuration indicates an assisting support mode, wherein, according to the assisting support mode, the method comprises:
receiving the at least one downlink channel quality;
receiving assisting information characterizing at least one present or future condition of the downlink channel receiving apparatus;
determining, based on the at least one downlink channel quality and based on the at least one assisting information, a further transmission parameter; and
transmitting, via the downlink channel, downlink data in accordance with the further transmission parameter.

15. The method according to claim 11, further comprising:
receiving at least one further estimation quality indicator that indicates a difference with respect to the previously received at least one estimation quality indicator;
determining a further transmission parameter based at least on the previously received at least one estimation quality indicator and based on the received at least one further estimation quality indicator; and
transmitting, via the downlink channel, another downlink data in accordance with the determined further transmission parameter.

16. An apparatus including a radio access node of a radio access network or a module of the radio access node, comprising:
a receiver configured to receive at least one future downlink channel quality indicator that characterizes an estimated future quality associated with a downlink channel;

a receiver configured to receive at least one estimation quality indicator that characterizes an estimation quality of the at least one associated future downlink channel indicator;

a processor configured to determine at least one transmission parameter based at least on the received at least one future downlink channel quality indicator and based on the at least one estimation quality indicator; and a transmitter configured to transmit, via the downlink channel, downlink data in accordance with the determined at least one transmission parameter, wherein the at least one future downlink channel indicator and the at least one estimation quality indicator are determined based at least on a first latent code and/or a second latent code, the first latent code determined based on at least one downlink channel quality and the second latent code determined based on assisting data.

* * * * *